US008874318B2

(12) United States Patent
Kariatsumari et al.

(10) Patent No.: US 8,874,318 B2
(45) Date of Patent: *Oct. 28, 2014

(54) MOTOR CONTROL UNIT AND MOTOR CONTROL UNIT FOR VEHICLE STEERING APPARATUS

(71) Applicant: JTEKT Corporation, Osaka (JP)

(72) Inventors: Yuji Kariatsumari, Yamatotakada (JP); Satoshi Shinoda, Neyagawa (JP); Hayato Komatsu, Ama-gun (JP); Terutaka Tamaizumi, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,152

(22) Filed: Nov. 26, 2012

(65) Prior Publication Data
US 2013/0076283 A1 Mar. 28, 2013

Related U.S. Application Data

(63) Continuation of application No. 12/721,855, filed on Mar. 11, 2010, now abandoned.

(30) Foreign Application Priority Data

Mar. 12, 2009 (JP) ................................ 2009-059859
Nov. 6, 2009 (JP) ................................ 2009-255219

(51) Int. Cl.
B62D 5/04 (2006.01)
B62D 5/14 (2006.01)
H02P 21/00 (2006.01)
H02P 21/14 (2006.01)
H02P 6/18 (2006.01)

(52) U.S. Cl.
CPC ............ *H02P 6/183* (2013.01); *H02P 21/0035* (2013.01); *H02P 21/14* (2013.01); *H02P 21/145* (2013.01); *H02P 21/146* (2013.01); *B62D 5/046* (2013.01)
USPC ................................ 701/41; 701/42; 180/443

(58) Field of Classification Search
CPC ..... B62D 5/046; B62D 5/0463; B62D 5/0472
USPC .................................. 701/424, 521; 180/443
See application file for complete search history.

(56) References Cited

U.S. PATENT DOCUMENTS 5,513,720 A   5/1996   Yamamoto et al.
5,568,389 A   10/1996  McLaughlin et al.
(Continued)

FOREIGN PATENT DOCUMENTS

EP   1 487 098 A1   12/2004
EP   1 955 926 A2    8/2008
(Continued)

OTHER PUBLICATIONS

European Search Report issued in European Patent Application No. EP10156226, dated Jul. 20, 2010.
(Continued)

Primary Examiner — Helal A Algahaim
Assistant Examiner — Charles J Han
(74) Attorney, Agent, or Firm — Oliff PLC

(57) ABSTRACT

A motor control unit controls a motor including a rotor and a stator facing the rotor. A current drive unit drives the motor at an axis current value of a rotating coordinate system that rotates in accordance with a control angle that is a rotational angle used in a control. An addition angle calculation unit calculates an addition angle to be added to the control angle. A control angle calculation unit obtains, at every predetermined calculation cycle, a present value of the control angle by adding the addition angle that is calculated by the addition angle calculation unit to an immediately preceding value of the control angle. A torque detection unit detects a torque that is other than a motor torque and that is applied to a drive target driven by the motor. A command torque setting unit sets a command torque to be applied to the drive target. An addition angle correction unit compares the command torque set by the command torque setting unit with the detected torque detected by the torque detection unit, and corrects the addition angle based on a comparison result.

19 Claims, 12 Drawing Sheets

(56) References Cited

U.S. PATENT DOCUMENTS

| | | | |
|---|---|---|---|
| 5,928,298 | A | 7/1999 | Matsuoka et al. |
| 6,364,051 | B1 | 4/2002 | Kada et al. |
| 6,396,229 | B1 | 5/2002 | Sakamoto et al. |
| 6,397,969 | B1 | 6/2002 | Kasai et al. |
| 6,781,333 | B2 | 8/2004 | Koide et al. |
| 7,076,340 | B1 | 7/2006 | Inazumi et al. |
| 2002/0026270 | A1 | 2/2002 | Kurishige et al. |
| 2002/0180402 | A1 | 12/2002 | Koide et al. |
| 2003/0030404 | A1 | 2/2003 | Iwaji et al. |
| 2004/0267421 | A1 | 12/2004 | Eskritt et al. |
| 2005/0029972 | A1 | 2/2005 | Imai et al. |
| 2005/0257994 | A1 | 11/2005 | Fujita |
| 2005/0273236 | A1 | 12/2005 | Mori et al. |
| 2006/0086561 | A1 | 4/2006 | Hidaka |
| 2006/0090954 | A1 | 5/2006 | Sugitani et al. |
| 2006/0125439 | A1 | 6/2006 | Ajima et al. |
| 2007/0040528 | A1 | 2/2007 | Tomigashi et al. |
| 2007/0229021 | A1 | 10/2007 | Yoshida et al. |
| 2007/0273317 | A1 | 11/2007 | Endo et al. |
| 2007/0284181 | A1 | 12/2007 | Muranaka |
| 2008/0035411 | A1 | 2/2008 | Yamashita et al. |
| 2008/0047775 | A1 | 2/2008 | Yamazaki |
| 2008/0128197 | A1* | 6/2008 | Kawaguchi et al. .......... 180/444 |
| 2008/0201041 | A1* | 8/2008 | Jiang ................................ 701/42 |
| 2009/0069979 | A1 | 3/2009 | Yamashita et al. |
| 2009/0240389 | A1* | 9/2009 | Nomura et al. ................. 701/29 |
| 2010/0057300 | A1 | 3/2010 | Nishiyama |
| 2010/0094505 | A1 | 4/2010 | Kariatsumari et al. |
| 2010/0198462 | A1 | 8/2010 | Shinoda et al. |
| 2010/0263709 | A1 | 10/2010 | Norman et al. |
| 2011/0035114 | A1 | 2/2011 | Yoneda et al. |
| 2012/0080259 | A1 | 4/2012 | Ueda et al. |

FOREIGN PATENT DOCUMENTS

| | | |
|---|---|---|
| EP | 2 086 106 A2 | 8/2009 |
| EP | 2 159 133 A1 | 3/2010 |
| EP | 2 177 422 A2 | 4/2010 |
| EP | 2 216 895 A2 | 8/2010 |
| JP | A 4-161085 | 6/1992 |
| JP | A 6-305436 | 11/1994 |
| JP | A 9-226606 | 9/1997 |
| JP | A 10-76960 | 3/1998 |
| JP | A-10-243699 | 9/1998 |
| JP | A 2000-050689 | 2/2000 |
| JP | A 2001-37281 | 2/2001 |
| JP | A 2001-251889 | 9/2001 |
| JP | A 2002-359996 | 12/2002 |
| JP | A 2003-125594 | 4/2003 |
| JP | A 2003-182620 | 7/2003 |
| JP | A 2007-53829 | 3/2007 |
| JP | A 2007-267549 | 10/2007 |
| JP | A 2008-24196 | 2/2008 |
| JP | A 2008-087756 | 4/2008 |
| JP | A 2009-124811 | 6/2009 |
| JP | A 2010-178549 | 8/2010 |
| WO | WO 2007/139030 A1 | 12/2007 |
| WO | WO 2009/138830 A1 | 11/2009 |

OTHER PUBLICATIONS

Office Action issued in U.S. Appl. No. 12/721,855 dated May 24, 2012.
U.S. Appl. No. 12/823,573, filed Jun. 25, 2010.
U.S. Appl. No. 12/943,514, filed Nov. 10, 2010.
U.S. Appl. No. 12/696,604, filed Jan. 29, 2010.
U.S. Appl. No. 12/945,101, filed Nov. 12, 2010.
U.S. Appl. No. 12/946,187, filed Nov. 15, 2010.
U.S. Appl. No. 13/205,138, filed Aug. 8, 2011.
U.S. Appl. No. 12/997,168, filed Dec. 9, 2010.
Feb. 6, 2014 Office Action issued in U.S. Appl. No. 12/823,573.
Sep. 5, 2013 Office Action issued in U.S. Appl. No. 12/823,573.
Mar. 21, 2013 Office Action issued in U.S. Appl. No. 12/823,573.
Dec. 10, 2012 Office Action issued in U.S. Appl. No. 12/823,573.
Jun. 19, 2012 Office Action issued in U.S. Appl. No. 12/823,573.
Feb. 6, 2014 Office Action issued in U.S. Appl. No. 12/696,604.
Jul. 15, 2013 Office Action issued in U.S. Appl. No. 12/696,604.
Mar. 25, 2013 Office Action issued in U.S. Appl. No. 12/696,604.
Nov. 29, 2012 Office Action issued in U.S. Appl. No. 12/696,604.
Jun. 12, 2012 Office Action issued in U.S. Appl. No. 12/696,604.
Feb. 12, 2014 Office Action issued in U.S. Appl. No. 12/945,101.
Nov. 28, 2013 Office Action issued in Japanese Patent Application No. 2009-258962 (with translation).
Jul. 19, 2013 Office Action issued in U.S. Appl. No. 12/945,101.
Mar. 26, 2013 Office Action issued in U.S. Appl. No. 12/945,101.
Dec. 11, 2012 Office Action issued in U.S. Appl. No. 12/945,101.
Aug. 9, 2012 Office Action issued in U.S. Appl. No. 12/945,101.
Feb. 6, 2014 Office Action issued in U.S. Appl. No. 12/946,187.
Sep. 10, 2013 Office Action issued in U.S. Appl. No. 12/946,187.
Jul. 15, 2013 Office Action issued in U.S. Appl. No. 12/946,187.
Sep. 19, 2012 Office Action issued in U.S. Appl. No. 12/946,187.
Feb. 11, 2014 Office Action issued in U.S. Appl. No. 13/205,138.
Sep. 5, 2013 Office Action issued in U.S. Appl. No. 13/205,138.
Mar. 20, 2013 Office Action issued in U.S. Appl. No. 13/205,138.
Sep. 19, 2012 Search Report issued in European Patent Application No. 11177780.1.
Sep. 10, 2012 Office Action issued in U.S. Appl. No. 13/205,138.
Feb. 6, 2014 Office Action issued in U.S. Appl. No. 12/997,168.
Sep. 10, 2013 Office Action issued in U.S. Appl. No. 12/997,168.
Mar. 25, 2013 Office Action issued in U.S. Appl. No. 12/997,168.
Aug. 14, 2012 Office Action issued in U.S. Appl. No. 12/997,168.
Feb. 10, 2014 Office Action issued in U.S. Appl. No. 12/943,514.
Sep. 10, 2013 Office Action issued in U.S. Appl. No. 12/943,514.
Aug. 31, 2012 Office Action issued in U.S. Appl. No. 12/943,514.
Feb. 8, 2011 International Preliminary Report on Patentability issued in International Patent Application No. PCT/JP2009/002991 (with translation).
Oct. 6, 2009 Search Report issued in International Patent Application No. PCT/JP2009/002991 (with translation).
May 22, 2014 Office Action issued in Japanese Patent Application No. 2010-186220 (with translation).
Jun. 8, 2011 Extended Search Report issued in European Patent Application No. 10191142.8.

* cited by examiner

F I G . 10A
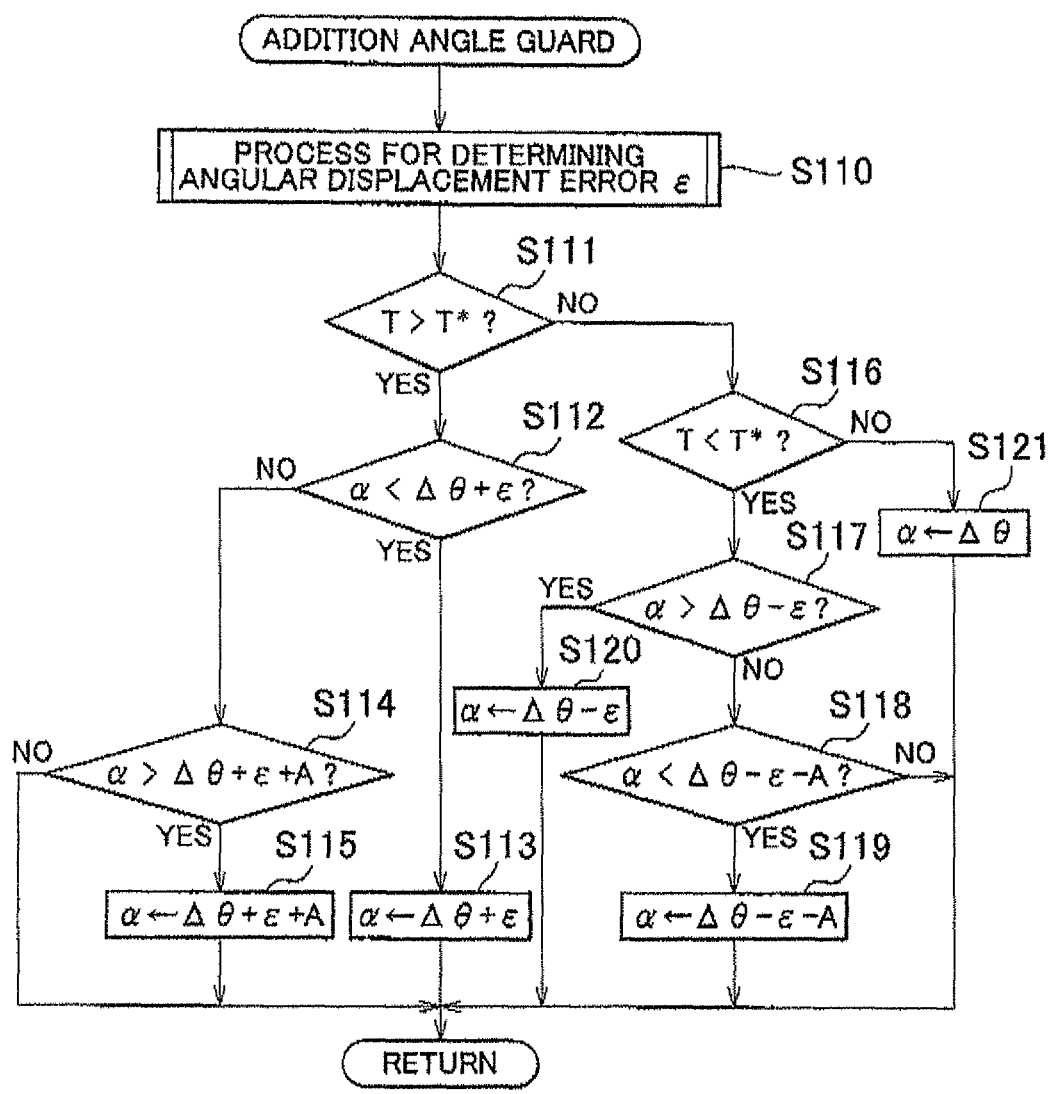

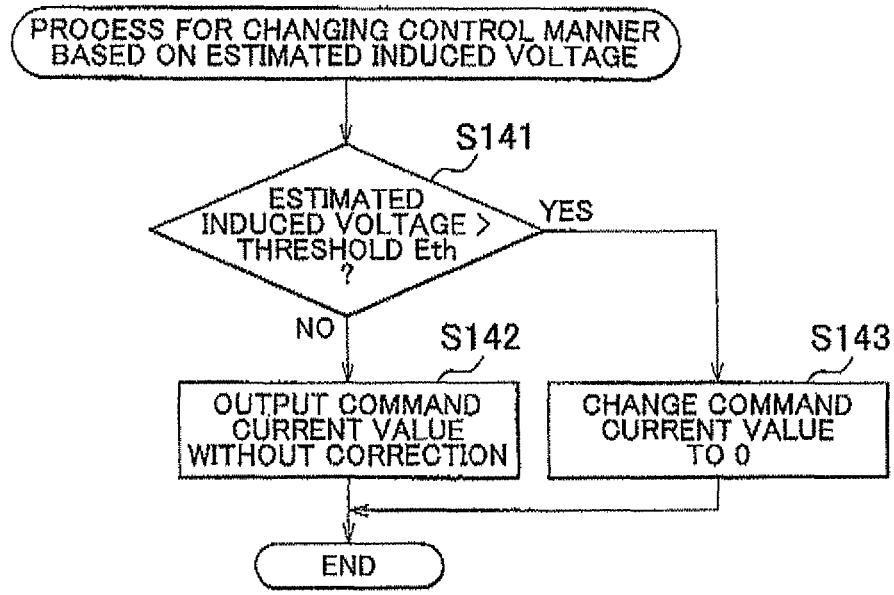
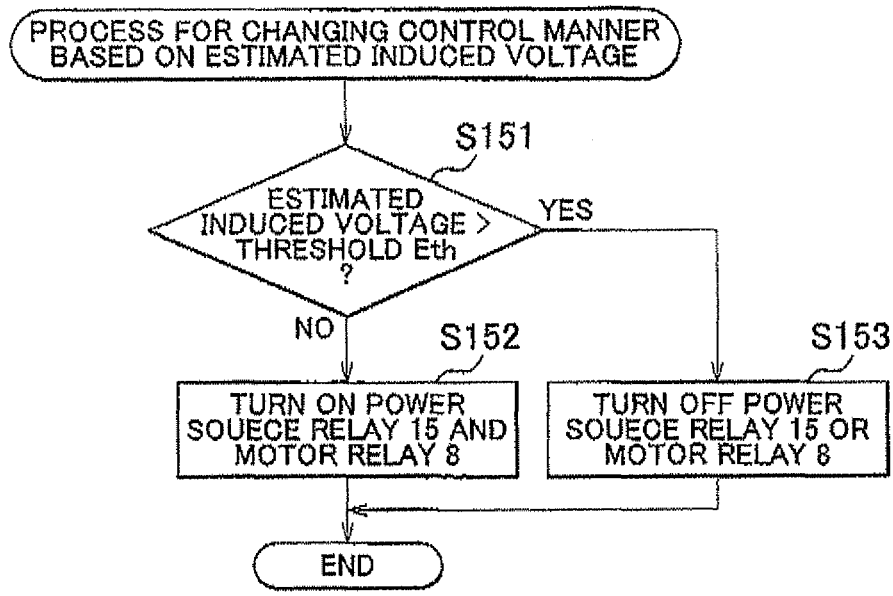

MOTOR CONTROL UNIT AND MOTOR CONTROL UNIT FOR VEHICLE STEERING APPARATUS

INCORPORATION BY REFERENCE

This is a Continuation of application Ser. No. 12/721,855 filed Mar. 11, 2010, which claims the benefit of Japanese Application No. 2009-059859 filed Mar. 12, 2009 and Japanese Application No. 2009-255219 filed Nov. 6, 2009. The disclosure of the prior applications are hereby incorporated by reference herein in its entirety.

BACKGROUND OF THE INVENTION

1. Field of the Invention

The invention relates to a motor control unit used to drive a brushless motor.

2. Description of the Related Art

A brushless motor may be used as a drive source for, for example, a vehicle steering apparatus. An example of a vehicle steering apparatus is an electric power steering apparatus. A motor control unit that controls driving of a brushless motor is usually configured to control the electric current that is supplied to a motor based on the output from a rotational angle sensor that detects the rotational angle of a rotor. As a rotational angle sensor, a resolver that outputs a sine-wave signal and a cosine-wave signal that correspond to the rotational angle (electrical angle) of a rotor is usually used. However, a resolver is expensive, and needs a large number of wires and a large installation space. Therefore, using a resolver as a rotational angle sensor hinders reduction in cost and size of a unit that includes a brushless motor.

US Patent No. 2007/0229021 A1 describes a sensorless drive method for driving a brushless motor without using a rotational angle sensor. According to the sensorless drive method, the induced voltage that varies depending on the rotational speed of a rotor is estimated in order to estimate the phase of a magnetic pole (electrical angle of the rotor). When the rotor is at a standstill or rotating at a considerably low speed, it is not possible to estimate the phase of the magnetic pole. Therefore, the phase of the magnetic pole is estimated by another method. More specifically, a sensing signal is input in a stator, and a response of the motor to the sensing signal is detected. Then, the rotational position of the rotor is estimated based on the response of the motor.

SUMMARY OF THE INVENTION

It is an object of the invention to provide a motor control unit that controls a motor according to a new control method that does not require a rotational angle sensor.

An aspect of the invention relates to a motor control unit that controls a motor including a rotor and a stator facing the rotor. A current drive unit drives the motor at an axis current value of a rotating coordinate system that rotates in accordance with a control angle that is a rotational angle used in a control. An addition angle calculation unit calculates an addition angle to be added to the control angle. A control angle calculation unit obtains, at every predetermined calculation cycle, a present value of the control angle by adding the addition angle that is calculated by the addition angle calculation unit to an immediately preceding value of the control angle. A torque detection unit detects a torque that is other than a motor torque and that is applied to a drive target driven by the motor. A command torque setting unit sets a command torque to be applied to the drive target. An addition angle correction unit compares the command torque set by the command torque setting unit with the detected torque detected by the torque detection unit, and corrects the addition angle based on a comparison result.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10A is a flowchart for describing the function of the addition angle guard according to a second embodiment of the invention when the load angle and the motor torque are positively correlated with each other;

FIG. 14 is a flowchart showing the steps of a process for changing the control manner based on the estimated induced voltage; and FIG. 15 is a flowchart showing the steps of a process for changing the control manner based on the estimated induced voltage according to a fourth embodiment of the invention.

DETAILED DESCRIPTION OF THE EXAMPLE EMBODIMENTS

Figure 1:
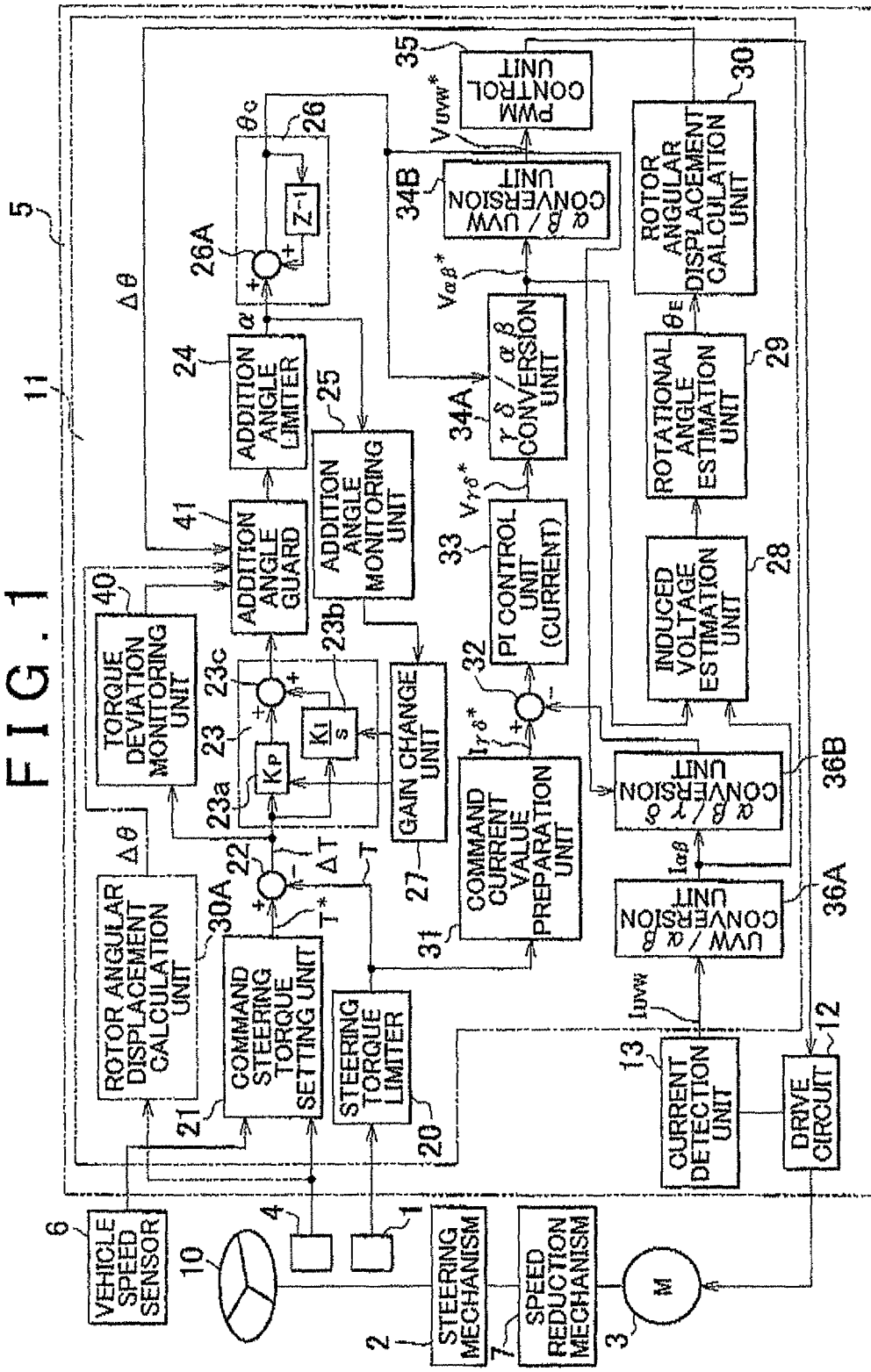
FIG. 1 is a block diagram illustrating the electrical configuration of an electric power steering apparatus that includes a motor control unit according to a first embodiment of the invention.

Hereafter, example embodiments of the invention will be described with reference to the accompanying drawings. FIG. 1 is a block diagram illustrating the electrical configuration of an electric power steering apparatus (an example of a vehicle steering apparatus) that includes a motor control unit according to a first embodiment of the invention. The electric power steering apparatus includes a torque sensor 1 that detects the steering torque T that is applied to a steering wheel 10 that serves as an operation member used to steer a vehicle, a motor 3 (brushless motor) that applies a steering assist force to a steering mechanism 2 of the vehicle via a speed reduction mechanism 7, a steering angle sensor 4 that detects the steering angle that is the rotational angle of the steering wheel 10, a motor control unit 5 that controls driving of the motor 3, and a vehicle speed sensor 6 that detects the speed of the vehicle in which the electric power steering apparatus is mounted.

The motor control unit 5 controls driving of the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed.

Figure 2:
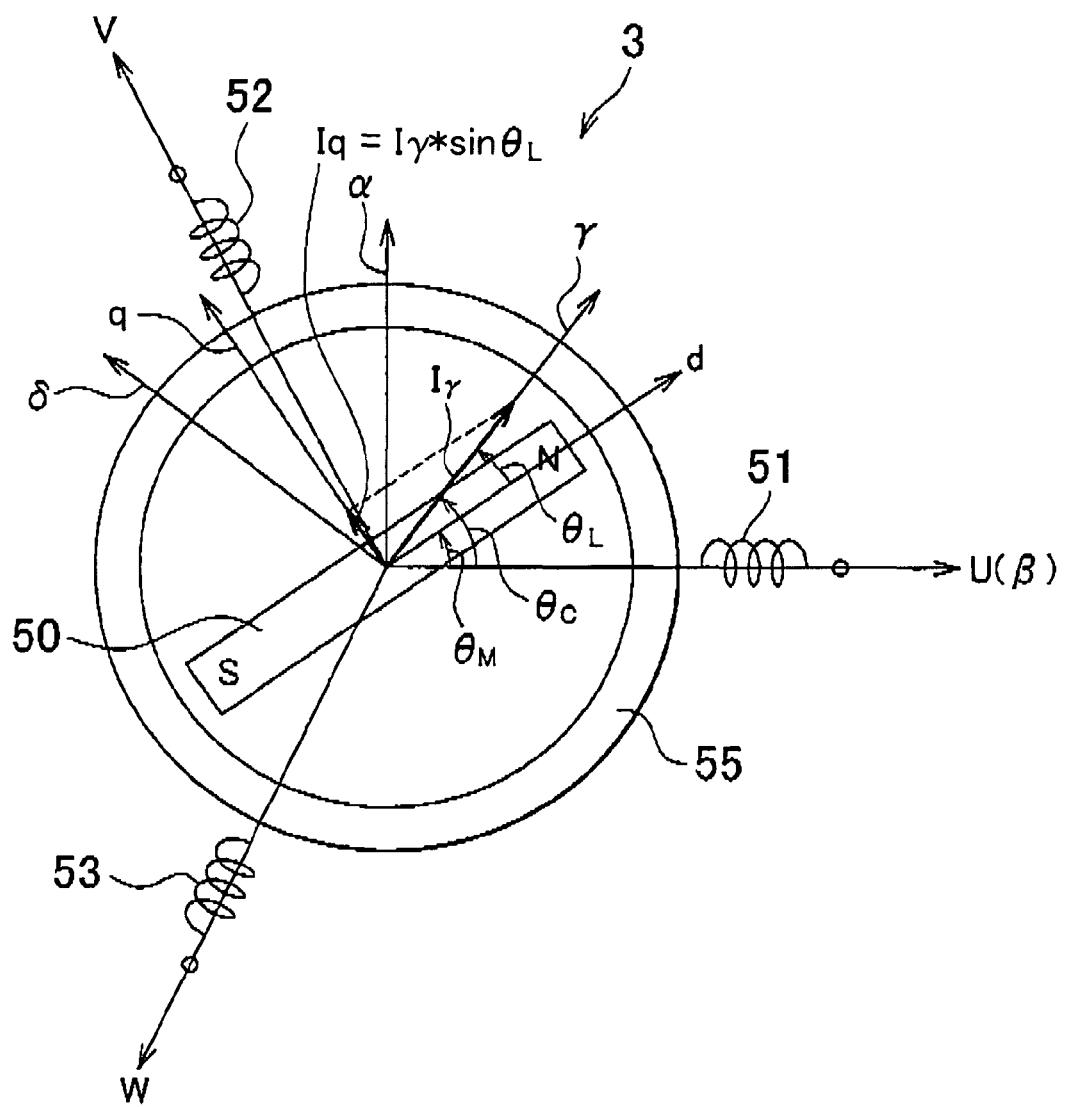
FIG. 2 is a view illustrating the configuration of a motor.

In the first embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) $\theta M$ of the rotor 50 is a rotational angle of the d-axis with respect to the U-axis. The dq coordinate system is an actual rotating coordinate system that rotates in accordance with the rotor angle $\theta M$. With the use of the rotor angle $\theta M$, coordinate conversion may be made between the UVW coordinate system and the dq coordinate system.

In the first embodiment, the control angle $\theta C$ that indicates the rotational angle used in the control is employed. The control angle $\theta C$ is an imaginary rotational angle with respect to the U-axis. An imaginary two-phase rotating coordinate system ($\gamma\delta$ coordinate system: hereafter, referred to as "imaginary rotating coordinate system". Hereafter, the coordinate axis of the imaginary rotating coordinate system will be referred to as "imaginary axis". Also, the axis current value of the imaginary axis will be referred to as "imaginary axis current value".), where the imaginary axis that forms the control angle $\theta C$ with the U-axis is used as the $\gamma$-axis, and the axis that is advanced 90 degrees from the $\gamma$-axis is used as the $\delta$-axis, is defined. When the control angle $\theta C$ is equal to the rotor angle $\theta M$, the $\gamma\delta$ coordinate system, which is the imaginary rotating coordinate system, and the dq coordinate system, which is the actual rotating coordinate system, coincide with each other. That is, the $\gamma$-axis, which is the imaginary axis, coincides with the d-axis, which is the actual axis, and the $\delta$-axis, which is the imaginary axis, coincides with the q-axis, which is the actual axis. The $\gamma\delta$ coordinate system is an imaginary rotating coordinate system that rotates in accordance with the control angle $\theta C$. Coordinate conversion may be made between the UVW coordinate system and the $\gamma\delta$ coordinate system with the use of the control angle $\theta C$.

The load angle $\theta L$ ($=\theta C - \theta M$) is defined based on the difference between the control angle $\theta C$ and the rotor angle $\theta M$.

When the $\gamma$-axis current $I\gamma$ is supplied to the motor 3 based on the control angle $\theta C$, the q-axis component of the $\gamma$-axis current $I\gamma$ (orthogonal projection to the q-axis) is used as the q-axis current Iq that contributes to generation of torque by the rotor 50. That is, the relationship expressed by Equation 1 is established between the $\gamma$-axis current $I\gamma$ and the q-axis current Iq.

$$Iq = I\gamma \times \sin \theta L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current IU, the V-phase current IV and the W-phase current IW that flow through the U-phase stator coil 51, the V-phase stator coil 52, and the W-phase stator coil 53 of the motor 3, respectively, (these phase currents will be collectively referred to as "three-phase detected current IUVW" where appropriate). The U-phase current IU, the V-phase current IV and the W-phase current IW are the current values in the directions of the axes of the UVW coordinate system.

The microcomputer 11 includes a CPU and memories (a ROM, a RAM, etc.), and serves as multiple function processing units by executing predetermined programs. The multiple function processing units include a steering torque limiter 20, a command steering torque setting unit 21, a torque deviation calculation unit 22, a PI (proportional integral) control unit 23, an addition angle limiter 24, an addition angle monitoring unit 25, a control angle calculation unit 26, a gain change unit 27, an induced voltage estimation unit 28, a rotational angle estimation unit 29, a rotor angular displacement calculation unit 30, a command current value preparation unit 31, a current deviation calculation unit 32, a PI control unit 33, a $\gamma\delta/\alpha\beta$ conversion unit 34A, an $\alpha\beta$/UVW conversion unit 34B, a PWM (Pulse Width Modulation) control unit 35, a UVW/$\alpha\beta$ conversion unit 36A, an $\alpha\beta/\gamma\delta$ conversion unit 36B, a torque deviation monitoring unit 40, and an addition angle guard 41.

Figure 4:
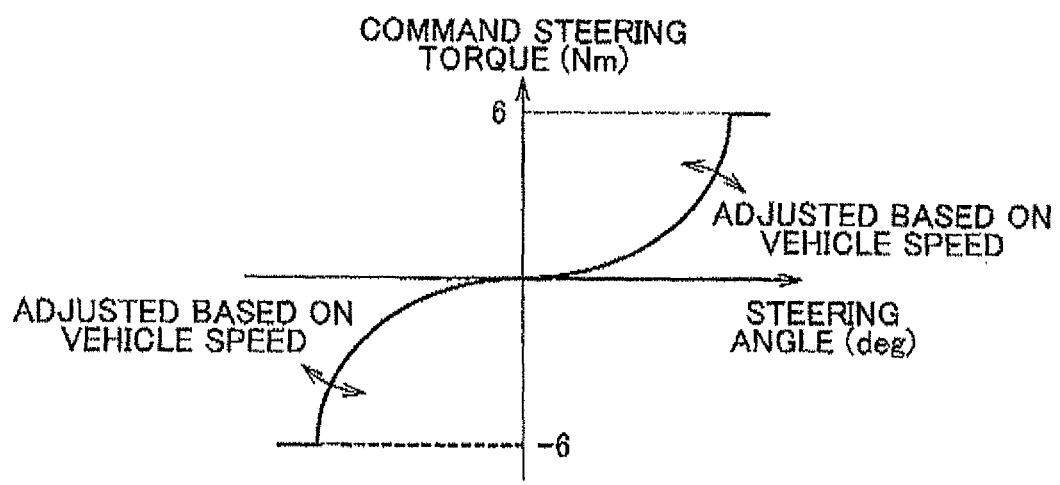
FIG. 4 is a graph showing an example of the characteristic of the command steering torque with respect to the steering angle.

The command steering torque setting unit 21 sets the command steering torque T* based on the steering angle detected by the steering angle sensor 4 and the vehicle speed detected by the vehicle speed sensor 6. For example, as shown in FIG. 4, the command steering torque T* when the steering angle is a positive value (when the steering wheel 10 is operated clockwise) is set to a positive value (torque applied in the clockwise direction), and the command steering torque T* when the steering angle is a negative value (when the steering wheel 10 is operated counterclockwise) is set to a negative value (torque applied in the counterclockwise direction). The command steering torque T* is set in such a manner that the absolute value of the command steering torque T* increases (non-linearly increases, in the example in FIG. 4) as the absolute value of the steering angle increases. However, the command steering torque T* is set to a value within a range between a predetermined upper limit (positive value (e.g. +6 Nm)) and a predetermined lower limit (negative value (e.g. −6 Nm)). In addition, the command steering torque T* is set in such a manner that the absolute value of the command steering torque T* decreases as the vehicle speed increases. That is, a vehicle speed-sensitive control is executed.

Figure 5:
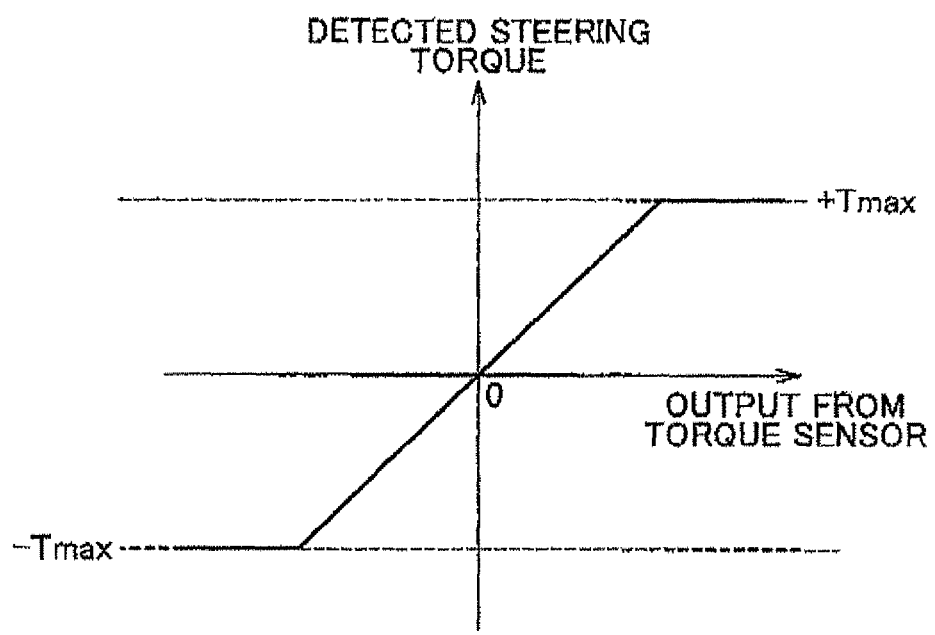
FIG. 5 is a graph for describing the function of a steering torque limiter.

The steering torque limiter 20 limits the output from the torque sensor 1 within a range between a predetermined upper saturation value +Tmax (+Tmax>0 (e.g. +Tmax=7 Nm)) and a predetermined lower saturation value −Tmax (−Tmax<0 (e.g. −Tmax=−7 Nm)). More specifically, as shown in FIG. 5, when the output from the torque sensor 1 is within the range between the upper saturation value +Tmax and the lower saturation value −Tmax, the steering torque limiter 20 outputs the detected steering torque T that is the value output from the torque sensor 1 without limitation. When the detected steering torque T from the torque sensor 1 is equal to or higher than the upper saturation value +Tmax, the steering torque limiter 20 outputs the upper saturation value +Tmax. When the detected steering torque T from the torque sensor 1 is equal to or lower than the lower saturation value −Tmax, the steering torque limiter 20 outputs the lower saturation value −Tmax. The saturation values +Tmax and −Tmax define a stable range (reliable range) of the output signal from the torque sensor 1. That is, in the range where the output from the torque sensor 1 is higher than the upper saturation value +Tmax and the range where the output from the torque sensor 1 is lower than the lower saturation value −Tmax, the output signal from the torque sensor 1 is unstable and does not correspond to the actual steering torque. In other words, the saturation values +Tmax and −Tmax are determined based on the output characteristic of the torque sensor 1.

The torque deviation calculation unit 22 obtains the deviation (torque deviation) ΔT (=T*−T) of the steering torque T that is detected by the torque sensor 1 and then subjected to the limiting process executed by the torque limiter 20 (hereinafter, referred to as "detected steering torque T" so as to be distinguished from the command steering torque T*) from the command steering torque T* that is set by the command steering torque setting unit 21. The PI control unit 23 executes the PI calculation on the torque deviation ΔT. That is, the torque deviation calculation unit 22 and the PI control unit 23 constitute a torque feedback control unit that brings the detected steering torque T to the command steering torque T*. The PI control unit 23 calculates the addition angle α for the control angle θC by executing the PI calculation on the torque deviation ΔT. Therefore, the torque feedback control unit constitutes an addition angle calculation unit that calculates the addition angle α.

More specifically, the PI control unit 23 includes a proportional element 23a, an integral element 23b, and an adder 23c. Note that KP is a proportional gain, KI is an integral gain, and 1/s is an integration operator. A proportional term (proportional calculation value) for a proportional integration calculation is obtained by the proportional element 23a, and an integral term (integral calculation value) for the proportional integration calculation is obtained by the integral element 23b. The adder 23c adds up the results of calculations executed by these elements 23a and 23b (the proportional term and the integral term) to obtain the addition angle α.

The addition angle limiter 24 is an addition angle limiting unit that imposes limits on the addition angle α obtained by the PI control unit 23. More specifically, the addition angle limiter 24 limits the addition angle α to a value within a range between a predetermined upper limit UL (positive value) and a predetermined lower limit LL (negative value). The upper limit UL and the lower limit LL are determined based on a predetermined limit ωmax (ωmax>0: e.g. ωmax=45 degrees). The predetermined limit ωmax is determined based on, for example, the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 2. The number of pole pairs is the number of magnetic pole pairs (pair of north pole and south pole) of the rotor 50.

Maximum rotor angular speed=maximum steering angular speed×speed reduction ratio×number of pole pairs    Equation 2

The maximum value of the amount of change in the electrical angle of the rotor 50 between the calculations (in the calculation cycle) of the control angle θC is expressed by the value obtained by multiplying the maximum rotor angular speed by the calculation cycle, as indicated by Equation 3.

Maximum value of amount of change in rotor angle=maximum rotor angular speed×calculation cycle=maximum steering angular speed×speed reduction ratio×number of pole pairs×calculation cycle    Equation 3

This maximum value of the amount of change in the rotor angle is the maximum amount of change in the control angle θC that is permitted within one calculation cycle. Therefore, the maximum value of the amount of change in the rotor angle may be used as the limit ωmax. With the use of the limit ωmax, the upper limit UL and the lower limit LL for the addition angle α are expressed by Equation 4 and Equation 5, respectively.

UL=+ωmax    Equation 4

LL=−ωmax    Equation 5

The addition angle α obtained after the above-described limiting process executed by the addition angle limiter 24 is added to the immediately preceding value θC(n−1) (n is the number of the present calculation cycle) of the control angle θC by an addition unit 26A of the control angle calculation unit 26 ("Z−1" in the drawings indicates the immediately preceding value indicated by a signal). Note that, the initial value of the control angle θC is a predetermined value (e.g. 0).

The control angle calculation unit 26 includes the addition unit 26A that adds the addition angle α provided from the addition angle limiter 24 to the immediately preceding value θC(n−1) of the control angle θC. That is, the control angle calculation unit 26 calculates the control angle θC at each predetermined calculation cycle. The control angle calculation unit 26 uses the control angle θC in the immediately preceding calculation cycle as the immediately preceding value θC(n−1), and obtains the present value θC(n) that is the control angle θC in the present calculation cycle based on the immediately preceding value θC(n−1).

The addition angle monitoring unit 25 monitors the addition angle α that is prepared by the addition angle limiter 24. More specifically, the addition angle monitoring unit 25 monitors whether the absolute value of the addition angle α has reached the addition angle threshold that is smaller than the limit ωmax. If the addition angle absolute value |α| is equal to or larger than the addition angle threshold, the addition angle monitoring unit 25 provides the gain change unit 27 with the information that the addition angle absolute value |α| is equal to or larger than the addition angle threshold.

When the information that the addition angle absolute value |α| is excessively large (equal to or larger than the addition angle threshold) is provided from the addition angle monitoring unit 25 to the gain change unit 27, the gain change unit 27 changes the gains (the proportional gain and the integral gain) of the PI control unit 23 to values that are smaller than the normal values. Thus, for example, when the steering speed is high, the gains of the PI control unit 23 are decreased before the addition angle limiter 24 is actuated. Therefore, limits are less likely to be imposed by the addition angle limiter 24. As a result, it is possible to stabilize the control, thereby improving a steering feel.

The gains of the PI control unit 23 are changed in such a manner that when the addition angle absolute value |α| is equal to or larger than the addition angle threshold, the gains are decreased. Alternatively, the gains of the PI control unit 23 may be changed in such a manner that the gains are decreased as the addition angle absolute value |α| increases.

The induced voltage estimation unit 28 estimates the induced voltage that is generated by the rotation of the motor 3. The rotational angle estimation unit 29 calculates the estimated value θE of the rotational angle (estimated rotational angle) of the rotor 50 based on the induced voltage that is estimated by the induced voltage estimation unit 28. Concrete examples of the induced voltage estimation unit 28 and the rotational angle estimation unit 29 will be described later.

The rotor angular displacement calculation unit 30 obtains the amount of change in the estimated rotational angle θE in the calculation cycle to obtain the angular displacement Δθ (value corresponding to the rotational angular speed) of the rotor 50 in the calculation cycle.

The command current value preparation unit 31 prepares, as command current values, values of electric currents that should be supplied to the coordinate axes (imaginary axes) of the γδ coordinate system, which is the imaginary rotating coordinate system that corresponds to the control angle θC that is a rotational angle used in the control. More specifically, the command current value preparation unit 31 prepares the γ-axis command current value Iγ* and the δ-axis command current value Iδ* (hereinafter, these values will be collectively referred to as "two-phase command current value Iγδ*" where appropriate). The command current value preparation unit 31 sets the γ-axis command current value Iγ* to a significant value, and sets the δ-axis command current value Iδ* to 0. More specifically, the command current value preparation unit 31 sets the γ-axis command current value Iγ* based on the detected steering torque T that is detected by the torque sensor 1.

Figure 6:
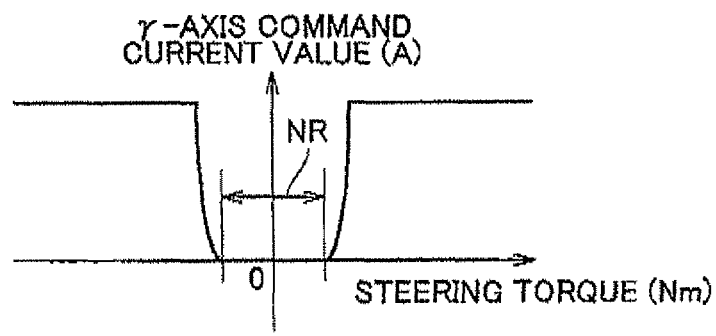
FIG. 6 is a graph showing an example of a manner of setting the $\gamma$-axis command current value.

FIG. 6 shows an example of a manner of setting the γ-axis command current value Iγ* with respect to the detected steering torque T. The dead band NR is set in a region near the point at which the detected steering torque T is 0. The γ-axis command current value Iγ* rises sharply in the region outside the dead band NR, and is maintained substantially constant in the region where the torque is at or higher than a predetermined value. Thus, when the driver does not operate the steering wheel 10, electric power supply to the motor 3 is stopped to suppress unnecessary electric power consumption.

The current deviation calculation unit 32 calculates the deviation Iγ*−Iγ of the γ-axis detected current Iγ from the γ-axis command current value Iγ* prepared by the command current value preparation unit 31 and the deviation Iδ*−Iδ of the δ-axis detected current Iδ from the δ-axis command current value Iδ*(=0) prepared by the command current value preparation unit 31. The γ-axis detected current Iγ and the δ-axis detected current Iδ are provided from the αβ/γδ conversion unit 36B to the deviation calculation unit 32.

The UVW/αβ conversion unit 36A converts the three-phase detected current IUVW (U-phase detected current IU, V-phase detected current IV, and the W-phase detected current IW) of the UVW coordinate system, which is detected by the current detection unit 13, into the two-phase detected currents Iα and Iβ of the αβ coordinate system that is the two-phase fixed coordinated system (hereinafter, these phase currents will be collectively referred to as "two-phase detected current Iαβ" where appropriate). As shown in FIG. 2, the αβ coordinate system is a fixed coordinate system that is defined by setting the α-axis and the β-axis that is perpendicular to the α-axis (in the example in FIG. 2, the β-axis coincides with the U-axis) within the rotary plane of the rotor 50 using the rotational center of the rotor 50 as the origin. The αβ/γδ conversion unit 36B converts the two-phase detected current Iαβ into the two-phase detected currents Iγ and Iδ of the γδ coordinate system (hereinafter, these phase currents will be collectively referred to as "two-phase detected current Iγδ" where appropriate). These two-phase detected currents Iγ and Iδ are provided to the current deviation calculation unit 32. The control angle θC calculated by the control angle calculation unit 26 is used for the coordinate conversion that is executed by the αβ/γδ conversion unit 36B.

The PI control unit 33 executes the PI calculation on the current deviation calculated by the current deviation calculation unit 32 to prepare the two-phase command voltage Vγδ* (the γ-axis command voltage Vγ* and the δ-axis command voltage Vδ*) that should be applied to the motor 3. The two-phase command voltage Vγδ* is provided to the γδ/αβ conversion unit 34A.

The γδ/αβ conversion unit 34A converts the two-phase command voltage Vγδ* into the two-phase command voltage Vαβ* of the αβ coordinate system. The control angle θC calculated by the control angle calculation unit 26 is used for this coordinate conversion. The two-phase command voltage Vαβ* is formed of the α-axis command voltage Vα* and the β-axis command voltage Vβ*. The αβ/UVW conversion unit 34B executes the coordinate conversion calculation on the two-phase command voltage Vαβ* to prepare the three-phase command voltage VUVW*. The three-phase command voltage VUVW* is formed of the U-phase command voltage VU*, the V-phase command voltage VV* and the W-phase command voltage VW*. The three-phase command voltage VUVW* is provided to the PWM control unit 35.

The PWM control unit 35 prepares the U-phase PWM control signal, the V-phase PWM control signal and the W-phase PWM control signal having duty ratios that correspond to the U-phase command voltage VU*, the V-phase command voltage VV* and the W-phase command voltage VW*, respectively, and provides the control signals to the drive circuit 12.

The drive circuit 12 is formed of an inverter circuit having three phases that correspond to the U-phase, the V-phase and the W-phase. The power elements that constitute the inverter circuit are controlled based on the PWM control signals provided from the PWM control unit 35, and therefore the voltages that correspond to the three-phase command voltage VUVW* are applied to the U-phase stator coil 51, the V-phase stator coil 52 and the W-phase stator coil 53 of the motor 3.

The current deviation calculation unit 32 and the PI control unit 33 constitute a current feedback control unit. The current feedback control unit controls the electric current that is supplied to the motor 3 in such a manner that the electric current that is supplied to the motor 3 approaches the two-phase command current value Iγδ* that is set by the command current value preparation unit 31.

The torque deviation monitoring unit 40 monitors the sign of the torque deviation ΔT that is calculated by the torque deviation calculation unit 22 to determine the magnitude relationship between the command steering torque T* and the detected steering torque T. The result of determination is provided to the addition angle guard 41.

The addition angle guard 41 executes an addition angle guard process on the addition angle α that is prepared by the PI control unit 23. In the addition angle guard process, if the addition angle α that is prepared by the PI control unit 23 contradicts the magnitude relationship between the command steering torque T* and the detected steering torque T, the addition angle α is corrected in such a manner that this contradiction is resolved. More specifically, the addition angle guard 41 corrects the addition angle α based on the rotor angular displacement Δθ that is obtained by the rotor angular displacement calculation unit 30, when necessary.

Figure 3:
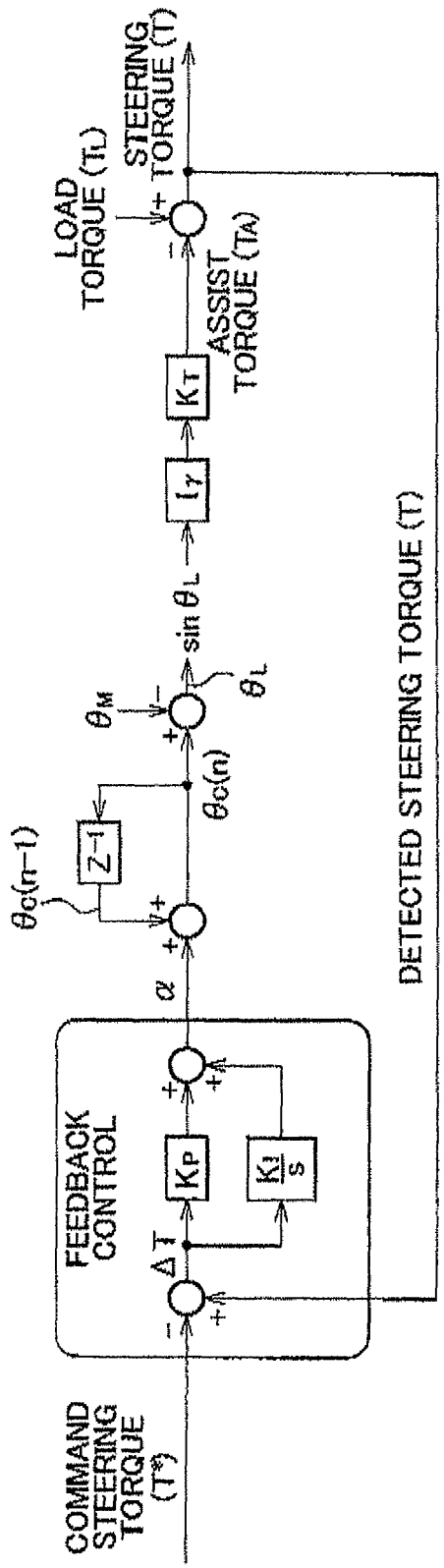
FIG. 3 is a control block diagram of the electric power steering apparatus.

FIG. 3 is a control block diagram of the electric power steering apparatus. Note that the functions of the addition angle guard 41 the addition angle limiter 24 are omitted to simplify the explanation.

Through the PI control (KP is a proportionality coefficient, KI is an integration coefficient, and 1/s is an integration operator) on the deviation (torque deviation) ΔT of the detected steering torque T from the command steering torque T*, the addition angle α is prepared. The present value θC(n) (θC(n)=θC(n−1)+α) of the control angle θC is obtained by adding the addition angle α to the immediately preceding value θC(n−1) of the control angle θC. At this time, the deviation of the actual rotor angle θM of the rotor 50 from the control angle θC is used as the load angle θL (θL=θC−θM).

Therefore, if the γ-axis current Iγ is supplied to the γ-axis (imaginary axis) in the γδ coordinate system (imaginary rotating coordinate system), which rotates in accordance with the control angle θC, based on the γ-axis command current value Iγ*, the q-axis current Iq is equal to Iγ sin θL (Iq=Iγ sin θL). The q-axis current Iq contributes to generation of torque by the rotor 50. That is, the value obtained by multiplying the q-axis current Iq (=Iγ sin θL) by the torque constant KT of the motor 3 is transmitted to the steering mechanism 2 via the speed reduction mechanism 7 as the assist torque TA (=KT×Iγ sin θL). The value obtained by subtracting the assist torque TA from the load torque TL from the steering mechanism 2 is the steering torque T that should be applied by the driver to the steering wheel 10. When the steering torque T is fed back, a system is operated in such a manner that the steering torque T is brought to the command steering torque T*. That is, the addition angle α is obtained and the control angle θC is controlled based on the addition angle α so that the detected steering torque T coincides with the command steering torque T*.

The control angle θC is updated with the use of the addition angle α that is obtained based on the deviation ΔT of the detected steering torque T from the command steering torque T* while an electric current is supplied to the γ-axis that is the imaginary axis used in the control. Thus, the load angle θL changes and therefore, the torque that corresponds to the load angle θL is generated by the motor 3. Therefore, the torque that corresponds to the command steering torque T* set based on the steering angle and the vehicle speed is generated by the motor 3. Accordingly, an appropriate steering assist force that corresponds to the steering angle and the vehicle speed is applied to the steering mechanism 2. That is, a steering assist control is executed in such a manner that the steering torque increases as the absolute value of the steering angle increases and the steering torque decreases as the vehicle speed increases.

Therefore, there is provided the electric power steering apparatus in which an appropriate steering assist operation is executed by appropriately controlling the motor 3 without using a rotational angle sensor. Thus, the configuration is simplified and cost is reduced.

In the first embodiment, the addition angle α is controlled in such a manner that the load angle θL is adjusted in a correlation region where the load angle θL and the motor torque (assist torque) are positively correlated with each other. More specifically, because the q-axis current Iq is equal to Iγ sin θL (Iq=Iγ sin θL), the addition angle α is controlled in such a manner that the load angle θL is equal to or larger than −90 degrees and equal to or smaller than 90 degrees (−90°≤θL≤90°). As a matter of course, the addition angle α may be controlled in such a manner that the load angle θL is adjusted in a correlation region where the load angle θL and the motor torque (assist torque) are negatively correlated with each other. In this case, the addition angle α is controlled in such a manner that the load angle θL is equal to or larger than 90 degrees and equal to or smaller than 270 degrees (90°≤θL≤270°). If the gain of the PI control unit 23 is set to a positive value, the control is executed within the correlation region where the load angle θL and the motor torque (assist torque) are positively correlated with each other. On the other hand, if the gain of the PI control unit 23 is set to a negative value, the control is executed within the correlation region where the load angle θL and the motor torque (assist torque) are negatively correlated with each other.

Figure 7:
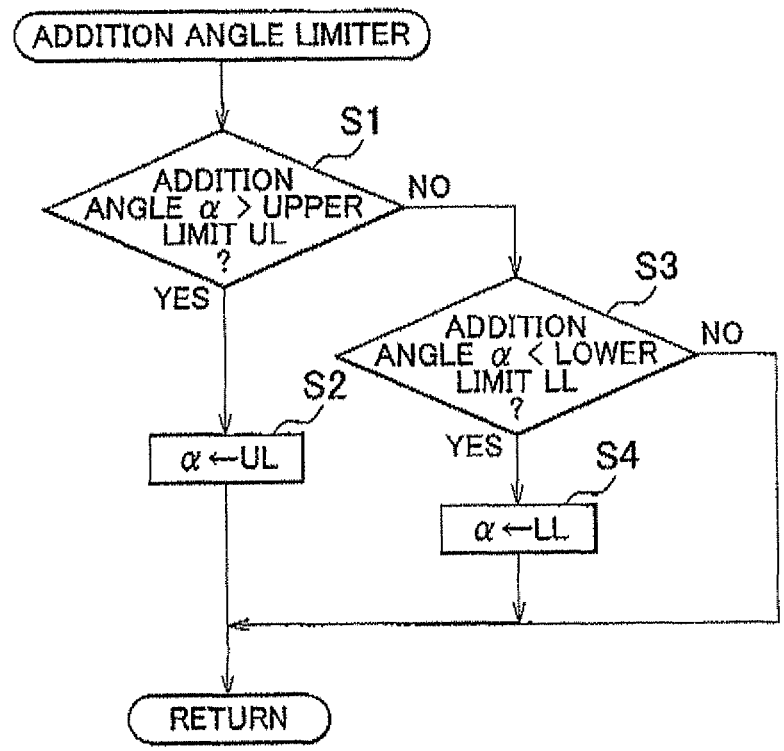
FIG. 7 is a flowchart for describing the function of an addition angle limiter.

FIG. 7 is a flowchart for describing the function of the addition angle limiter 24. The addition angle limiter 24 compares the addition angle α obtained by the PI control unit 23 and then corrected by the addition angle guard 41 with the upper limit UL (step (hereinafter, referred to as "S") 1). When the addition angle α is larger than the upper limit UL ("YES" in S1), the upper limit UL is substituted for the addition angle α (S2). Thus, the upper limit UL (=+ωmax) is added to the control angle θC.

The addition angle α is obtained by the PI control unit 23 and then corrected by the addition angle guard 41. When the addition angle α is equal to or smaller than the upper limit UL ("NO" in S1), the addition angle limiter 24 further compares the addition angle α with the lower limit LL (S3). When the addition angle α is smaller than the lower limit LL ("YES" in S3), the lower limit LL is substituted for the addition angle α (S4). Thus, the lower limit LL (=−ωmax) is added to the control angle θC.

When the addition angle α is equal to or larger than the lower limit LL and equal to or smaller than the upper limit UL ("NO" in S3), the addition angle α is added to the control angle θC without correction. Therefore, the addition angle limiter 24 limits the addition angle α within the range between the upper limit UL and the lower limit LL so as to stabilize the control. More specifically, although the control state is unstable (assist force is unstable) when the electric current is small or when the control starts, the addition angle limiter 24 encourage the control to move to the stable state.

Figure 8A:
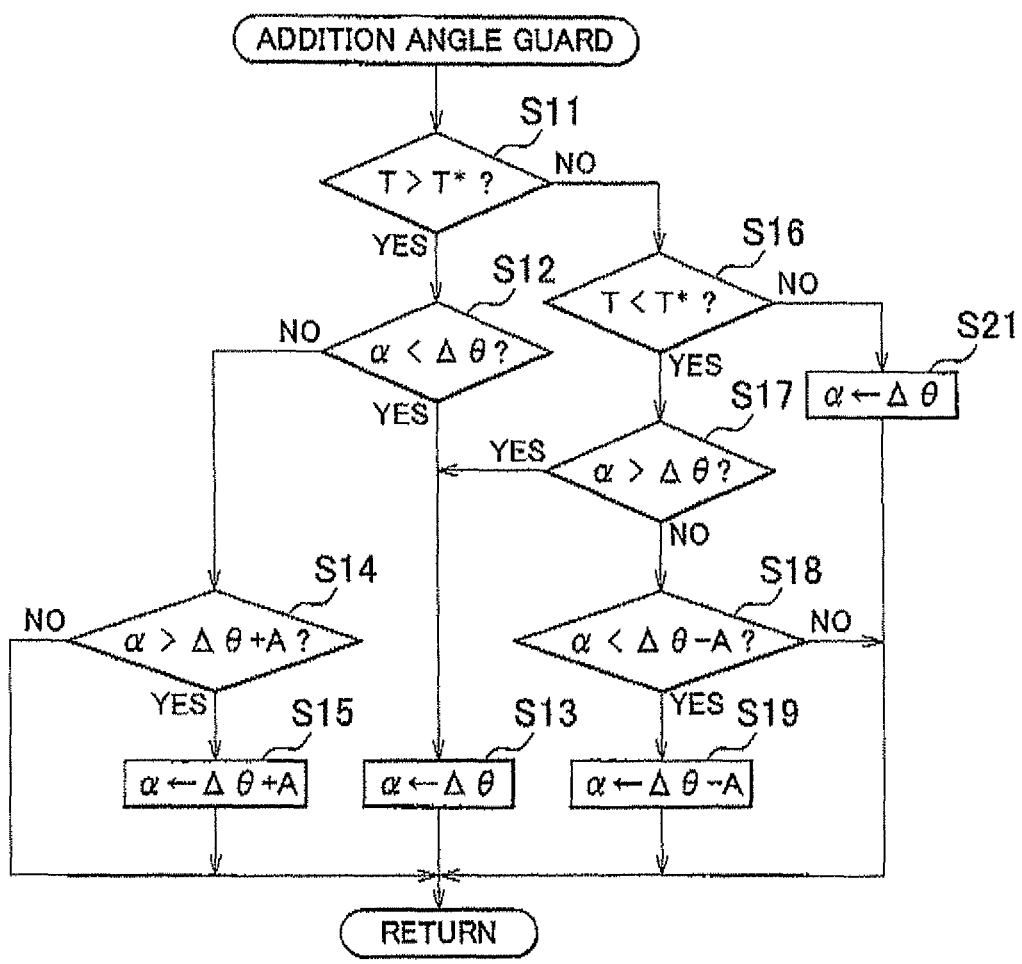
FIG. 8A is a flowchart for describing the function of an addition angle guard when the load angle and the motor torque are positively correlated with each other.

FIG. 8A is a flowchart for describing an addition angle guard process. Note that FIG. 8A shows an example of the process that is executed when the addition angle α is controlled in such a manner that the load angle θL is adjusted in the correlation region where the load angle θL and the motor torque (assist torque) are positively correlated with each other.

The torque deviation monitoring unit 40 monitors the sign of the torque deviation ΔT that is calculated by the torque deviation calculation unit 22, and provides the addition angle guard 41 with the information concerning the magnitude relationship between the command steering torque T* and the detected steering torque T.

When the detected steering torque T is higher than the command steering torque T* ("YES" in S11), the addition angle guard 41 determines whether the addition angle α that is obtained by the PI control unit 23 is smaller than the rotor angular displacement Δθ in the calculation cycle that is obtained by the rotor angular displacement calculation unit 30 (S12). When an affirmative determination is made in S12, the addition angle guard 41 substitutes the rotor angular displacement Δθ for the addition angle α (S13). That is, the addition angle α is corrected to the rotor angular displacement Δθ. If the addition angle α is equal to or larger than the rotor angular displacement Δθ ("NO" in S12), the addition angle guard 41 further compares the addition angle α with the value (Δθ+A) that is larger than the rotor angular displacement Δθ by the predetermined change limit A (A>0: e.g. A=7 degrees) (S14). When the addition angle α is larger than the value (Δθ+A) ("YES" in S14), the addition angle guard 41 substitutes the value (Δθ+A) for the addition angle α (S15). That is, the addition angle α is corrected to the value (Δθ+A) that is larger than the rotor angular displacement Δθ by the predetermined change limit A. When the addition angle α is equal to or smaller than the value (Δθ+A) ("NO" in S14), the addition angle α is not corrected.

On the other hand, when the detected steering torque T is lower than the command steering torque T* ("NO" in S11 and "YES" in S16), the addition angle guard 41 determines whether the addition angle α obtained by the PI control unit 23 is larger than the rotor angular displacement Δθ (S17). When an affirmative determination is made in S17, the addition angle guard 41 substitutes the rotor angular displacement Δθ for the addition angle α (S13) to correct the addition angle α to the rotor angular displacement Δθ. When the addition angle α is equal to or smaller than the rotor angular displacement Δθ ("NO" in S17), the addition angle guard 41 further compares the addition angle α with the value (Δθ−A) that is smaller than the rotor angular displacement Δθ by the change limit A (S18). When the addition angle α is smaller than the value (Δθ−A) ("YES" in S18), the addition angle guard 41 substitutes the value (Δθ−A) for the addition angle α (S19). That is, the addition angle α is corrected to the value (Δθ−A) that is smaller than the rotor angular displacement Δθ by the predetermined change limit A. When the addition angle α is equal to or larger than the value (Δθ−A) ("NO" in S18), the addition angle α is not corrected.

When the detected steering torque T is equal to the command steering torque T* ("NO" in both S11 and S16), the addition angle guard 41 substitutes the rotor angular displacement Δθ for the addition angle ca (S21). That is, the addition angle α is corrected to the rotor angular displacement Δθ.

The addition angle α is the amount of change in the control angle θC in the calculation cycle, and is equal to the angular displacement (corresponding to the rotational angular speed) of the γδ coordinate axis in the calculation cycle. Therefore, when the addition angle α is larger than the rotor angular displacement Δθ in the calculation cycle, the load angle θL is increased. On the other hand, when the addition angle α is smaller than the rotor angular displacement Δθ in the calculation cycle, the load angle θL is decreased. When the load angle θL and the motor torque (assist torque) are positively correlated with each other, the motor torque is increased if the load angle θL increases, and the motor torque is decreased if the load angle θL decreases.

When the detected steering torque T is higher than the command steering torque T*, the motor torque (assist torque) is insufficient. Therefore, the load angle θL is increased in order to increase the motor torque. That is, when the addition angle α is equal to or larger than the rotor angular displacement Δθ, the load angle θL is increased. Because the motor torque increases, the detected steering torque T approaches the command steering torque T*. In the first embodiment, in S11 to S13 in FIG. 8A, the addition angle guard process is executed. In this addition angle guard process, the addition angle α is corrected to a value equal to or larger than the rotor angular displacement Δθ when the detected steering torque T is higher than the command steering torque T*. In other words, if the addition angle α is smaller than the rotor angular displacement Δθ although the detected steering torque T is higher than the command steering torque T*, the object of the control is not achieved and there is a contradiction. Such a situation may occur depending on, for example, the response of the PI control unit 23. Therefore, in this case, the addition angle α is corrected to a value equal to or larger than the rotor angular displacement Δθ (in the first embodiment, the addition angle α is corrected to the value equal to the rotor angular displacement Δθ). As a matter of course, the addition angle α may be corrected to a value larger than the rotor angular displacement Δθ (for example, a value that is larger than the rotor angular displacement Δθ by a predetermined value (a value smaller than the change limit A)).

The following process is executed based on the same concept. When the detected steering torque T is lower than the command steering torque T*, the motor torque (assist torque) is excessive. Therefore, the load angle θL is decreased to decrease the motor torque. That is, when the addition angle α is equal to or smaller than the rotor angular displacement Δθ, the load angle θL is decreased. Because the motor torque decreases, the detected steering torque T approaches the command steering torque T*. Therefore, in the first embodiment, in S16, S17 and S13 in FIG. 8A, the addition angle guard process is executed. In this addition angle guard process, the addition angle α is corrected to a value equal to or smaller than the rotor angular displacement Δθ when the detected steering torque T is lower than the command steering torque T*. In other words, if the addition angle α is larger than the rotor angular displacement Δθ although the detected steering torque T is lower than the command steering torque T*, the object of the control is not achieved and there is a contradiction. Such a situation may occur depending on, for example, the response of the PI control unit 23. Therefore, in this case, the addition angle α is corrected to a value equal to or smaller than the rotor angular displacement Δθ (in the first embodiment, the addition angle α is corrected to the value equal to the rotor angular displacement Δθ). As a matter of course, the addition angle α may be corrected to a value smaller than the rotor angular displacement Δθ (for example, a value that is smaller than the rotor angular displacement Δθ by a predetermined value (a value smaller than the change limit A)).

In the first embodiment, when the detected steering torque T is higher than the command steering torque T* ("YES" in S11) and the addition angle α is equal to or larger than the rotor angular displacement Δθ ("NO" in S12), the addition angle α is compared with the value that is obtained by adding the change limit A to the rotor angular displacement Δθ (S14). When the addition angle α is larger than the value that is obtained by adding the change limit A to the rotor angular displacement Δθ ("YES" in S14), the addition angle α is corrected to the value (Δθ+A) (S15). This is because, if the addition angle α is excessively larger than the rotor angular displacement Δθ in the calculation cycle, it takes a long time to bring the addition angle α to an appropriate value.

When the detected steering torque T is lower than the command steering torque T* ("YES" in S16) and the addition angle α is equal to or smaller than the rotor angular displacement Δθ ("NO" in S17), the addition angle α is compared with the value that is obtained by subtracting the change limit A from the rotor angular displacement Δθ (S18). When the addition angle α is smaller than the value that is obtained by subtracting the change limit A from the rotor angular displacement Δθ ("YES" in S18), the addition angle α is corrected to the value (Δθ−A) (S19). This is because, if the addition angle α is excessively smaller than the rotor angular displacement Δθ in the calculation cycle, it takes a long time to bring the addition angle α to an appropriate value. If the above-described correction is made, the addition angle α is more easily brought to the appropriate value. Therefore, it is possible to stabilize the control. Even if an abnormality occurs in the control, it is possible to effectively encourage the control to move to the normal state.

As described above, in the guard process in FIG. 8A, when the detected steering torque T is higher than the command steering torque T*, the addition angle α is corrected in such a manner that the addition angle α is equal to or smaller than (Δθ+A) and equal to or larger than Δθ (Δθ+A≥α≥Δθ). On the other hand, when the detected steering torque T is lower than the command steering torque T*, the addition angle α is corrected in such a manner that the addition angle α is equal to or smaller than Δθ and equal to or larger than (Δθ−A) (Δθ≥α≥Δθ−A). Thus, the addition angle α is brought to an appropriate value corresponding to the rotor angular displacement Δθ.

Figure 8B:
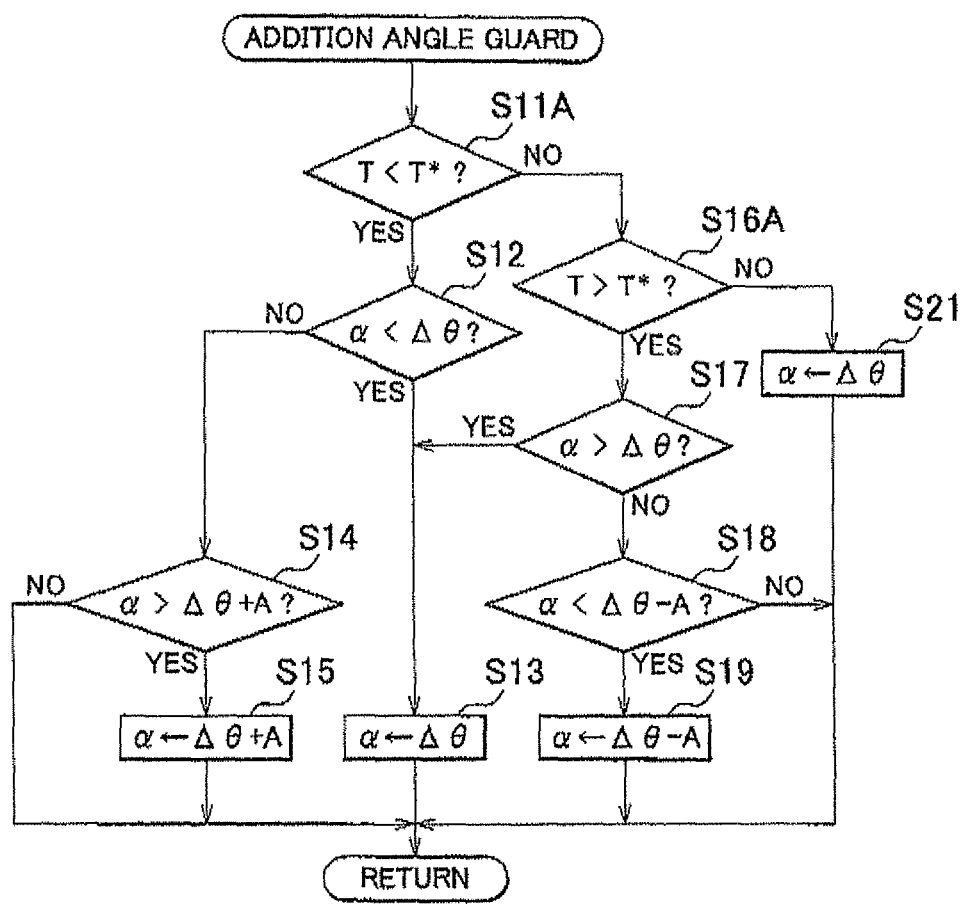
FIG. 8B is a flowchart for describing the function of the addition angle guard when the load angle and the motor torque are negatively correlated with each other.

FIG. 8B shows an example of the addition angle guard process when the addition angle α is controlled in such a manner that the load angle θL is adjusted within the correlation region where the load angle θL and the motor torque (assist torque) are negatively correlated with each other. The steps in FIG. 8B, in which the same processes as those in the steps in FIG. 8A are executed, are denoted by the same reference numerals used in FIG. 8A. In the process shown in FIG. 8B, the processes based on the magnitude relationship between the detected steering torque T and the command steering torque T* are executed in a manner opposite to that in FIG. 8A.

When the detected steering torque T is lower than the command steering torque T* ("YES" in S11A), the addition angle guard 41 determines whether the addition angle α is smaller than the rotor angular displacement Δθ (S12). If an affirmative determination is made in S12, the addition angle guard 41 substitutes the rotor angular displacement Δθ for the addition angle α (S13). That is, the addition angle α is corrected to the rotor angular displacement Δθ. When the addition angle α is equal to or larger than the rotor angular displacement Δθ ("NO" in S12), the addition angle guard 41 further compares the addition angle α with the value (Δθ+A) that is larger than the rotor angular displacement Δθ by the change limit A (S14). When the addition angle α is larger than the value (Δθ+A) ("YES" in S14), the addition angle guard 41 substitutes the value (Δθ+A) for the addition angle α (S15). That is, the addition angle α is corrected to the value (Δθ+A). When the addition angle α is equal to or smaller than the value (Δθ+A) ("NO" in S14), the addition angle α is not corrected.

On the other hand, when the detected steering torque T is higher than the command steering torque T* ("NO" in S11A and "YES" in S16A), the addition angle guard 41 determines whether the addition angle α is larger than the rotor angular displacement Δθ (S17). If an affirmative determination is made in S17, the addition angle guard 41 substitutes the rotor angular displacement Δθ for the addition angle α (S13) to correct the addition angle α to the rotor angular displacement Δθ. When the addition angle α is equal to or smaller than the rotor angular displacement Δθ ("NO" in S17), the addition angle guard 41 further compares the addition angle α with the value (Δθ−A) that is smaller than the rotor angular displacement Δθ by the change limit A (S18). When the addition angle α is smaller than the value (Δθ−A) ("YES" in S18), the addition angle guard 41 substitutes the value (Δθ−A) for the addition angle α (S19). That is, the addition angle α is corrected to the value (Δθ−A). When the addition angle α is equal to or larger than the value (Δθ−A) ("NO" in S18), the addition angle α is not corrected.

When the detected steering torque T is equal to the command steering torque T* ("NO" in both S11A and S16A), the addition angle guard 41 substitutes the rotor angular displacement Δθ for the addition angle α (S21). That is, the addition angle α is corrected to the rotor angular displacement Δθ.

When the load angle θL and the motor torque (assist torque) are negatively correlated with each other, the motor torque is decreased if the load angle θL increases, and the motor torque is increased if the load angle θL decreases.

When the detected steering torque T is lower than the command steering torque T*, the motor torque (assist torque) is excessive. Therefore, the load angle θL is increased to decrease the motor torque. That is, when the addition angle α is equal to or larger than the rotor angular displacement Δθ, the load angle θL is increased. Because the motor torque decreases, the detected steering torque T approaches the command steering torque T*. In the first embodiment, in S11A to S13 in FIG. 8B, the addition angle guard process is executed. In this addition angle guard process, the addition angle α is corrected to a value equal to or larger than the rotor angular displacement Δθ when the detected steering torque T is lower than the command steering torque T*. In other words, if the addition angle α is smaller than the rotor angular displacement Δθ although the detected steering torque T is lower than the command steering torque T*, the object of the control is not achieved and there is a contradiction. Therefore, in this case, the addition angle α is corrected to a value equal to or larger than the rotor angular displacement Δθ (in the first embodiment, the addition angle α is corrected to the value equal to the rotor angular displacement Δθ). As a matter of course, the addition angle α may be corrected to a value that is larger than the rotor angular displacement Δθ (for example, a value that is larger than the rotor angular displacement Δθ by a predetermined value (a value that is smaller than the change limit A)).

The following process is executed based on the same concept. When the detected steering torque T is higher than the command steering torque T*, the motor torque (assist torque) is insufficient. Therefore, the load angle GL is decreased to increase the motor torque. That is, when the addition angle α is equal to or smaller than the rotor angular displacement Δθ, the load angle GL is decreased. Because the motor torque increases, the detected steering torque T approaches the command steering torque T*. In the first embodiment, in S16A, S17 and S13 in FIG. 8B, the addition angle guard process is executed. In this addition angle guard process, the addition angle α is corrected to a value equal to or smaller than the rotor angular displacement Δθ when the detected steering torque T is higher than the command steering torque T*. In other words, if the addition angle α is larger than the rotor angular displacement Δθ although the detected steering torque T is higher than the command steering torque T*, the object of the control is not achieved and there is a contradiction. Therefore, in this case, the addition angle α is corrected to a value equal to or smaller than the rotor angular displacement Δθ (in the first embodiment, the addition angle α is corrected to the value equal to the rotor angular displacement Δθ). As a matter of course, the addition angle α may be corrected to a value smaller than the rotor angular displacement Δθ (for example, a value that is smaller than the rotor angular displacement Δθ by a predetermined value (a value smaller than the change limit A)).

In the process in FIG. 8B, when the detected steering torque T is lower than the command steering torque T* ("YES" in S11A) and the addition angle α is equal to or larger than the rotor angular displacement Δθ ("NO" in S12), the addition angle α is compared with the value that is obtained by adding the change limit A to the rotor angular displacement Δθ (S14). When the addition angle α is larger than the value that is obtained by adding the change limit A to the rotor angular displacement Δθ ("YES" in S14), the addition angle α is corrected to the value (Δθ+A) (S15). This is because, if the addition angle α is excessively larger than the rotor angular displacement Δθ in the calculation cycle, it takes a long time to bring the addition angle α to an appropriate value.

When the detected steering torque T is higher than the command steering torque T* ("YES" in S16A) and the addition angle α is equal to or smaller than the rotor angular displacement Δθ ("NO" in S17), the addition angle α is compared with the value that is obtained by subtracting the change limit A from the rotor angular displacement Δθ (S18). When the addition angle α is smaller than the value that is obtained by subtracting the change limit A from the rotor angular displacement Δθ ("YES" in S18), the addition angle α is corrected to the value (Δθ−A) (S19). This is because, if the addition angle α is excessively smaller than the rotor angular displacement Δθ in the calculation cycle, it takes a long time to bring the addition angle α to an appropriate value. If the above-described correction is made, the addition angle α is more easily brought to the appropriate value. Therefore, it is possible to stabilize the control. Even if an abnormality occurs in the control, it is possible to effectively encourage the control to move to the normal state.

If the above-described process is executed, when the detected steering torque T is lower than the command steering torque T*, the addition angle α is corrected in such a manner that the addition angle α is equal to or smaller than (Δθ+A) and equal to or larger than Δθ (Δθ+A≥α≥Δθ). On the other hand, when the detected steering torque T is higher than the command steering torque T*, the addition angle α is corrected in such a manner that the addition angle α is equal to or smaller than Δθ and equal to or larger than (Δθ−A) (Δθ≥α≥Δθ−A). Thus, the addition angle α is brought to an appropriate value corresponding to the rotor angular displacement Δθ.

Figure 9:
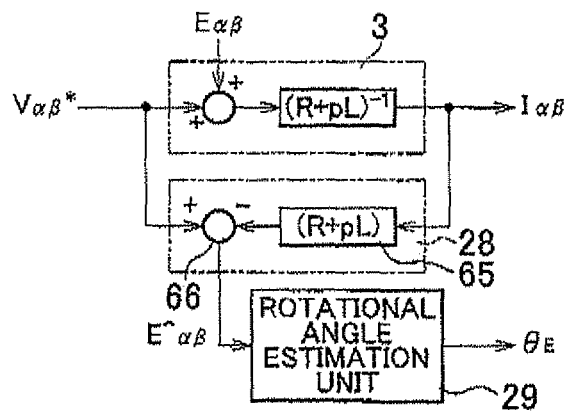
FIG. 9 is a block diagram illustrating the configurations of an induced voltage estimation unit and a rotational angle estimation unit.

FIG. 9 is a block diagram for describing the configurations of the inducted voltage estimation unit 28 and the rotational angle estimation unit 29. The induced voltage estimation unit 28 estimates the inducted voltage of the motor 3 based on the two-phase detected current Iαβ and the two-phase command voltage Vαβ*. More specifically, the induced voltage estimation unit 28 is formed as a disturbance observer that estimates the induced voltage of the motor 3 as a disturbance based on a motor model that is a mathematical model of the motor 3. The motor model may be expressed by, for example, (R+pL)−1. Note that R is an armature coil resistance, L is an αβ-axis inductance, and p is a differential operator. It is considered that the two-phase command voltage Vαβ* and the induced voltage Eαβ (α-axis induced voltage Ea and the β-axis induced voltage Eβ) are applied to the motor 3.

The induced voltage estimation unit 28 is formed of an inverse motor model (inverse model of the motor model) 65 that estimates the motor voltage using the two-phase detected current Iαβ as an input, and a voltage deviation calculation unit 66 that obtains the deviation of the motor voltage that is estimated by the inverse motor model 65 from the two-phase command voltage Vαβ*. The voltage deviation calculation unit 66 obtains the disturbance to the two-phase command voltage Vαβ*. As is clear from FIG. 9, the disturbance is the estimated value Eˆαβ (α-axis induced voltage estimated value Eˆα and the β-axis induced voltage estimated value Eˆβ (hereinafter, collectively referred to as "estimated induced voltage Eˆαβ")) corresponding to the induced voltage Eαβ. The inverse motor model 65 is expressed by, for example, R+pL.

The induced voltage Eαβ is expressed by Equation 6. Note that KE is the induced voltage constant, θM is the rotor angle, and ω is the rotor rotational angular speed.

$$E_{\alpha\beta} = \begin{bmatrix} E_\alpha \\ E_\beta \end{bmatrix} = \begin{bmatrix} -K_E \omega \sin\theta_M \\ K_E \omega \cos\theta_M \end{bmatrix} \tag{6}$$

Therefore, when the estimated induced voltage Eˆαβ is obtained, the estimated rotational angle θE is obtained according to Equation 7. The rotational angle estimation unit 29 executes the calculation according to Equation 7.

$$\theta_E = \tan^{-1} \frac{-\hat{E}_\alpha}{\hat{E}_\beta} \tag{7}$$

A modification of the addition angle guard process that is executed by the addition angle guard 41 will be described below. As described above, the induced voltage estimation unit 28 estimates the induced voltage of the motor 3 based on the motor model expressed with the use of the armature resistance R and the αβ-axis inductance L, the two-phase command voltage Vαβ*, and the two-phase detected current Iαβ. The rotational angle estimation unit 29 calculates the estimated rotational angle θE based on the estimated induced voltage Eˆαβ calculated by the induced voltage estimation unit 28. The rotor angular displacement calculation unit 30 calculates the rotor angular displacement Δθ in the calculation cycle based on the estimated rotational angle θE calculated by the rotational angle estimation unit 29.

Therefore, an error may be caused in the estimated induced voltage Eˆαβ that is estimated by the induced voltage estimation unit 28 due to setting errors (deviations from the actual values) in the armature resistance R and the αβ-axis inductance L that are set for estimation of the induced voltage and a detection error in the two-phase detected current Iαβ. If an error is caused in the estimated induced voltage Eˆαβ, an error may be caused also in the rotor angular displacement Δθ in the calculation cycle that is calculated by the rotor angular displacement calculation unit 30.

Next, a second embodiment of the invention will be described. When an error is caused in the rotor angular displacement Δθ in the calculation cycle, even if the addition angle guard process in the first embodiment is executed, there is a possibility that the addition angle α is not brought to an appropriate value. Therefore, in the second embodiment, the addition angle guard process in which an error in the rotor angular displacement Δθ is taken into account is executed. The concept of the addition angle guard process in the second embodiment will be described below.

When the addition angle α is adjusted in such a manner that the load angle θL is adjusted in the correlation region where the load angle θL and the assist torque are positively correlated with each other, if the detected steering torque T is higher than the command steering torque T*, the assist torque is insufficient. Therefore, the load angle θL is increased to increase the motor torque. That is, when the addition angle α is brought to a value equal to or larger than the actual rotor angular displacement Δθtrue, the load angle θL increases. Because the motor torque increases, the detected steering torque T approaches the command steering torque T*.

In the addition angle guard process in the first embodiment, for example, when the addition angle α is smaller than the rotor angular displacement Δθ calculated by the rotor angular displacement calculation unit 30, the addition angle α is corrected to the rotor angular displacement Δθ (see S12 and S13 in FIG. 8A). However, when there is an error in the rotor angular displacement Δθ calculated by the rotor angular displacement calculation unit 30, for example, when the calculated rotor angular displacement Δθ is smaller than the actual rotor angular displacement Δθtrue (Δθ<Δθtrue), even if the addition angle α is corrected to the rotor angular displacement Δθ, the addition angle α does not reach the actual rotor angular displacement Δθtrue. In such a case, if the addition angle α is corrected to the value that is obtained by adding the error to the rotor angular displacement Δθ calculated by the rotor angular displacement calculation unit 30, it is possible to bring the addition angle α to a value equal to or larger than the actual rotor angular displacement Δθtrue.

In the second embodiment, the maximum value of the error in the rotor angular displacement Δθ in the calculation cycle (hereinafter, referred to as "angular displacement maximum error εmax") is obtained in advance based on the maximum values of the setting errors in the armature resistance R and the αβ-axis inductance L and the maximum value of the detection error in the two-phase detected current Iαβ. When the detected steering torque T is higher than the command steering torque T*, basically, the addition angle α is corrected to a value equal to or larger than the value (Δθ+εmax) that is obtained by adding the angular displacement maximum error εmax to the rotor angular displacement Δθ calculated by the rotor angular displacement calculation unit 30. For example, when the addition angle α is smaller than the value (Δθ+εmax) that is obtained by adding the angular displacement maximum error εmax to the rotor angular displacement Δθ, the addition angle α is corrected to the value (Δθ+εmax) that is obtained by adding the angular displacement maximum error εmax to the rotor angular displacement Δθ. If the addition angle α is corrected in the above-described manner, even when there is an error in the rotor angular displacement Δθ (for example, even if Δθ=Δθtrue−εmax), it is possible to set the addition angle α to a value equal to or larger than the actual rotor angular displacement Δθtrue when the detected steering torque T is higher than the command steering torque T*.

On the other hand, when the detected steering torque T is lower than the command steering torque T*, the assist torque is excessive. Therefore, the load angle θL is decreased in order to decrease the motor torque. That is, when the addition angle α is brought to a value equal to or smaller than the actual rotor angular displacement Δθtrue, the load angle θL is decreased. Because the motor torque is decreased, the detected steering torque T approaches the command steering torque T*.

In the addition angle guard process in the first embodiment, for example, when the addition angle α is larger than the rotor angular displacement Δθ calculated by the rotor angular displacement calculation unit 30, the addition angle α is corrected to the rotor angular displacement Δθ (see S17 and S13 in FIG. 8A). However, when there is an error in the rotor angular displacement Δθ calculated by the rotor angular displacement calculation unit 30, for example, when the calculated rotor angular displacement Δθ is larger than the actual rotor angular displacement Δθtrue (Δθ>Δθtrue), even if the addition angle α is corrected to the rotor angular displacement Δθ, the addition angle α does not fall below the rotor angular displacement Δθtrue. In such a case, if the addition angle α is corrected to the value that is obtained by subtracting the error (angular displacement error) in the rotor angular displacement from the rotor angular displacement Δθ calculated by the rotor angular displacement calculation unit 30, it is possible to bring the addition angle α to a value equal to or smaller than the actual rotor angular displacement Δθtrue.

In the second embodiment, when the detected steering torque T is lower than the command steering torque T*, basically, the addition angle α is corrected to a value that is equal to or smaller than the value (Δθ−εmax) that is obtained by subtracting the angular displacement maximum error εmax from the rotor angular displacement Δθ calculated by the rotor angular displacement calculation unit 30. For example, when the addition angle α is larger than the value (Δθ−εmax) that is obtained by subtracting the angular displacement maximum error εmax from the rotor angular displacement Δθ, the addition angle α is corrected to the value (Δθ−εmax) that is obtained by subtracting the angular displacement maximum error εmax from the rotor angular displacement Δθ. When the addition angle α is corrected in the above-described manner, even if there is an error in the rotor angular displacement Δθ (for example, even if Δθ=Δθtrue+εmax), it is possible to set the addition angle α to a value equal to or smaller than the actual rotor angular displacement Δθtrue when the detected steering torque T is lower than the command steering torque T*.

The second embodiment will be described below in detail.

FIG. 10A is a flowchart illustrating an addition angle guard process according to the second embodiment. FIG. 10A shows an example of the process when the addition angle α is controlled in such a manner that the load angle θL is adjusted in the correlation region where the load angle ΔθL and the motor torque (assist torque) are positively correlated with each other.

The torque deviation monitoring unit 40 monitors the sign of the torque deviation ΔT that is calculated by the torque deviation calculation unit 22, and provides the addition angle guard 41 with the information concerning the magnitude relationship between the command steering torque T* and the detected steering torque T.

The addition angle guard 41 executes the process for determining the angular displacement error ε that is used to correct the addition angle α in the present calculation cycle (hereinafter, referred to as "process for determining the angular displacement error ε") (S110). The initial value of the angular displacement error ε is the above-described angular displacement maximum error εmax. The process for determining the angular displacement error ε will be described later in detail.

When the angular displacement error ε is determined through the process for determining the angular displacement error ε, the addition angle guard 41 determines whether the detected steering torque T is higher than the command steering torque T* (S111). When the detected steering torque T is higher than the command steering torque T* ("YES" in S111), the addition angle guard 41 determines whether the addition angle α obtained by the PI control unit 23 is smaller than the value (hereinafter, referred to as "error added value (Δθ+ε)") that is obtained by adding the angular displacement error ε to the rotor angular displacement Δθ in the calculation cycle a that is obtained by the rotor angular displacement calculation unit 30 (S112). If an affirmative determination is made in S112, the addition angle guard 41 substitutes the error added value (Δθ+ε) for the addition angle α (S113). That is, the addition angle α is corrected to the error added value (Δθ+ε). When the addition angle α is equal to or larger than the error added value (Δθ+ε) ("NO" in S112), the addition angle guard 41 further compares the addition angle α with the value (Δθ+ε+A) that is larger than the error added value (Δθ+ε) by a predetermined change limit A (A>0: for example, A=7 degrees) (S114). When the addition angle α is larger than the value (Δθ+ε+A) ("YES" in S114), the addition angle guard 41 substitutes the value (Δθ+ε+A) for the addition angle α (S115). That is, the addition angle α is corrected to the value (Δθ+ε+A). When the addition angle α is equal to or smaller than the value (Δθ+ε+A) ("NO" in S114), the addition angle α is not corrected.

On the other hand, when the detected steering torque T is lower than the command steering torque T* ("NO" in S111 and "YES" in S116), the addition angle guard 41 determines whether the addition angle α obtained by the PI control unit 23 is larger than the value (hereinafter, referred to as "error subtracted value (Δθ−ε)") that is obtained by subtracting the angular displacement error ε from the rotor angular displacement Δθ (S117). If an affirmative determination is made in S117, the addition angle guard 41 substitutes the error subtracted value (Δθ−ε) for the addition angle α (S120), to correct the addition angle α to the error subtracted value (Δθ−ε). When the addition angle α is equal to or smaller than the error subtracted value (Δθ−ε) ("NO" in S117), the addition angle guard 41 further compares the addition angle α with the value (Δθ−ε−A) that is smaller than the error subtracted value (Δθ−ε) by the change limit A (S118). When the addition angle α is smaller than the value (Δθ−ε−A) ("YES" in S118), the addition angle guard 41 substitutes the value (Δθ−ε−A) for the addition angle α (S119). When the addition angle α is equal to or larger than the value (Δθ−ε−A) ("NO" in S118), the addition angle α is not corrected.

When the detected steering torque T is equal to the command steering torque T* ("NO" in both S111 and S116), the addition angle guard 41 substitutes the rotor angular displacement Δθ for the addition angle α (S121). That is, the addition angle α is corrected to the rotor angular displacement Δθ.

As described above, in the addition angle guard process in FIG. 10A, when the detected steering torque T is higher than the command steering torque T*, the addition angle α is corrected in such a manner that the addition angle α is equal to or smaller than (Δθ+ε+A) and equal to or larger than (Δθ+ε) ((Δθ+ε+A)≥α≥(Δθ+ε)). On the other hand, when the detected steering torque T is lower than the command steering torque T*, the addition angle α is corrected in such a manner that the addition angle α is equal to or smaller than (Δθ−ε) and equal to or larger than (Δθ−ε−A) ((Δθ−ε)≥α≥(Δθ−ε−A)). Thus, the addition angle α is brought to an appropriate value that corresponds to the value (Δθ+ε) that is obtained by adding the angular displacement error ε to the rotor angular displacement Δθ and the value (Δθ−ε) that is obtained by subtracting the angular displacement error ε from the rotor angular displacement Δθ.

Figure 10B:
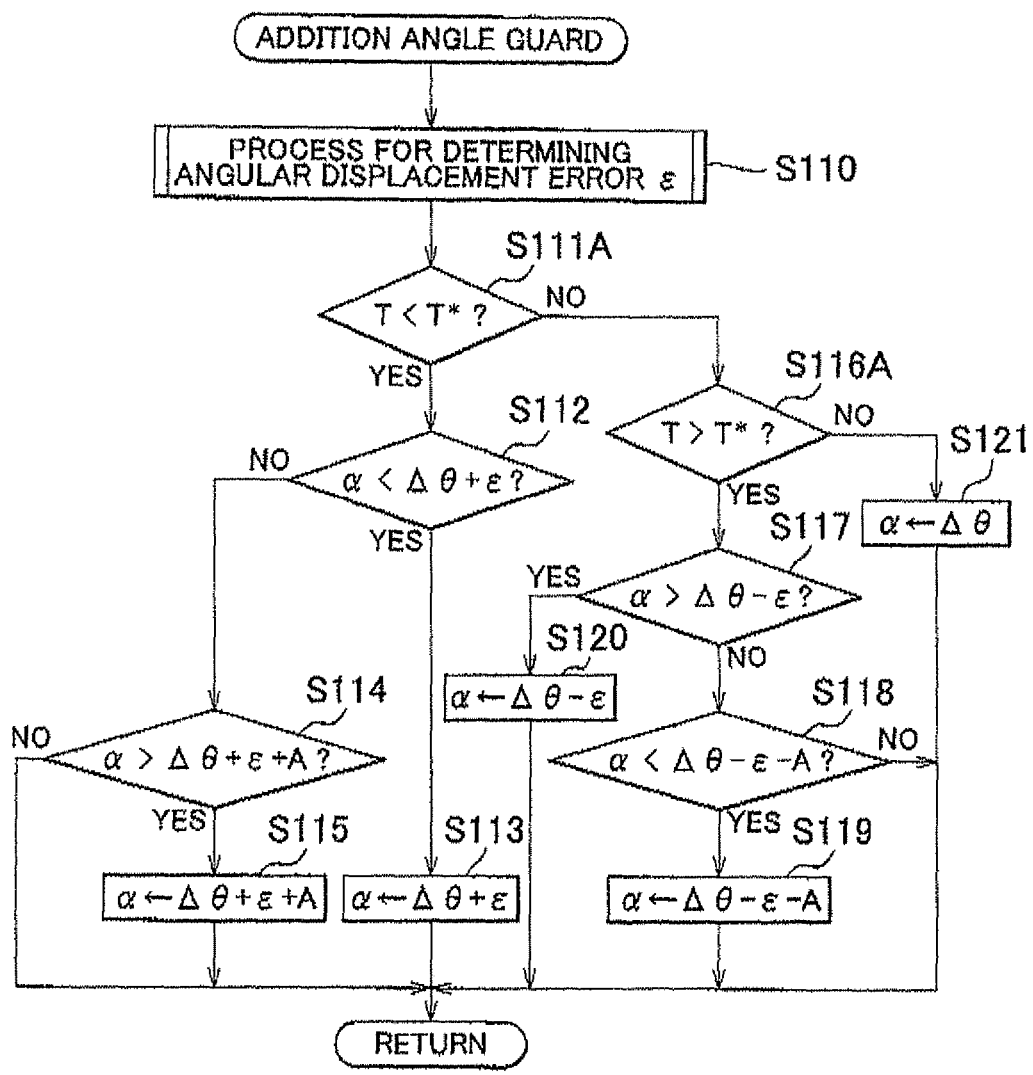
FIG. 10B is a flowchart for describing the function of the addition angle guard according to the second embodiment when the load angle and the motor torque are negatively correlated with each other.

FIG. 10B shows an example of an addition angle guard process when the addition angle α is controlled in such a manner that the load angle θL is adjusted in the correlation region where the load angle θL and the motor torque (assist torque) are negatively correlated with each other. The steps in FIG. 10B, in which the same processes as those in the steps in FIG. 10A are executed, are denoted by the same reference numerals used in FIG. 10A.

In the process shown in FIG. 10B as well, first, the addition angle guard 41 executes the process for determining the angular displacement error ε (S110). After the angular displacement error ε is determined through the process for determining the angular displacement error ε, the processes based on the magnitude relationship between the detected steering torque T and the command steering torque T* are executed in a manner opposite to that in FIG. 10A. That is, when the detected steering torque T is lower than the command steering torque T* ("YES" in S111A), the addition angle guard 41 determines whether the addition angle α is smaller than the value (error added value (Δθ+ε)) that is obtained by adding the angular displacement error ε to the rotor angular displacement Δθ (S112). If an affirmative determination is made in S112, the addition angle guard 41 substitutes the error added value (Δθ+ε) for the addition angle α (S113). That is, the addition angle α is corrected to the error added value (Δθ+ε). When the addition angle α is equal to or larger than the error added value (Δθ+ε) ("NO" in S112), the addition angle guard 41 further compares the addition angle α with the value (Δθ+ε+A) that is larger than the error added value (Δθ+ε) by the change limit A (S114). When the addition angle α is larger than the value (Δθ+ε+A) ("YES" in S14), the addition angle guard 41 substitutes the value (Δθ+ε+A) for the addition angle α (S115). That is, the addition angle α is corrected to the value (Δθ+ε+A). When the addition angle α is equal to or smaller than the value (Δθ+ε+A) ("NO" in S114), the addition angle α is not corrected.

When the detected steering torque T is higher than the command steering torque T* ("NO" in S11A and "YES" in S116A), the addition angle guard 41 determines whether the addition angle α is larger than the value (error subtracted value (Δθ−ε)) that is obtained by subtracting the angular displacement error ε from the rotor angular displacement Δθ (S117). If an affirmative determination is made in S117, the addition angle guard 41 substitutes the error subtracted value (Δθ−ε) for the addition angle α (S120) to correct the addition angle α to the error subtracted value (Δθ−ε). When the addition angle α is equal to or smaller than the error subtracted value (Δθ−ε) ("NO" in S117), the addition angle guard 41 further compares the addition angle α with the value (Δθ−ε−A) that is smaller than the error subtracted value (Δθ−ε) by the change limit A (S118). When the addition angle α is smaller than the value (Δθ−ε−A) ("YES" in S118), the addition angle guard 41 substitutes the value (Δθ−ε−A) for the addition angle α (S119). That is, the addition angle α is corrected to the value (Δθ−ε−A). When the addition angle α is equal to or larger than the value (Δθ−ε−A) ("NO" in S118), the addition angle α is not corrected.

When the detected steering torque T is equal to the command steering torque T* ("NO" in both S111A and S116A), the addition angle guard 41 substitutes the rotor angular displacement Δθ for the addition angle α (S121). That is, the addition angle α is corrected to the rotor angular displacement Δθ.

If the above-described process is executed, when the detected steering torque T is lower than the command steering torque T*, the addition angle α is corrected in such a manner that the addition angle α is equal to or smaller than (Δθ+ε+A) and equal to or larger than (Δθ+ε) ((Δθ+ε+A)≥α≥(Δθ+ε)). On the other hand, when the detected steering torque T is higher than the command steering torque T*, the addition angle α is corrected in such a manner that the addition angle α is equal to or smaller than (Δθ−ε) and equal to or larger than (Δθ−ε−A) ((Δθ−ε)≥α≥(Δθ−ε−A)). Thus, the addition angle α is corrected to an appropriate value corresponding to the value (Δθ+ε) that is obtained by adding the angular displacement error ε to the rotor angular displacement Δθ and the value (Δθ−ε) that is obtained by subtracting the angular displacement error a from the rotor angular displacement Δθ.

Figure 11:
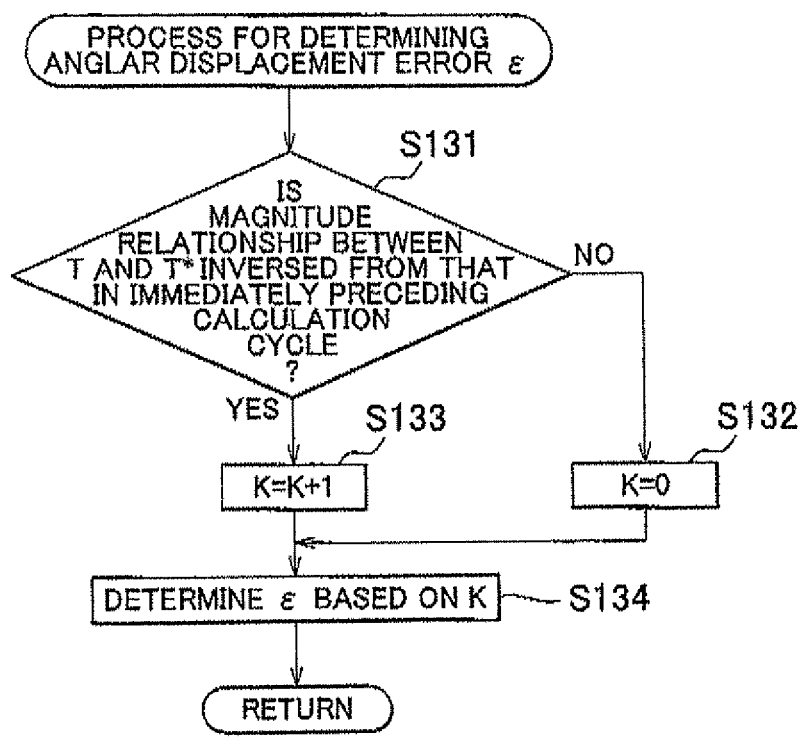
FIG. 11 is a flowchart showing the steps of a process for determining the angular displacement error.

FIG. 11 is a flowchart showing the steps of a process for determining the angular displacement error ε that is executed in S110 in FIG. 10A or FIG. 10B.

Because the angular displacement maximum error εmax is the maximum value of the angular displacement error, it is considered that the actual angular displacement error is usually smaller than the angular displacement maximum error εmax. Accordingly, if the angular displacement error ε is set to the angular displacement maximum error εmax and the addition angle guard process shown in FIG. 10A or FIG. 10B is executed, the addition angle α may be excessively increased when the addition angle α is corrected so as to be increased, or the addition angle α may be excessively decreased when the addition angle α is corrected so as to be decreased. This causes a possibility that the addition angle α is alternatively changed to a value that is larger than the appropriate value and a value that is smaller than the appropriate value, and the addition angle α is not easily brought to an appropriate value. Therefore, in the process for determining the angular displacement error ε, the angular displacement error ε is set to a value smaller than the angular displacement maximum error εmax in the situation where the magnitude relationship between the detected steering torque T and the command steering torque T* is inversed at every calculation cycle. Thus, the addition angle α is more easily brought to an appropriate value.

In the process for determining the angular displacement error ε, the addition angle guard 41 determines whether the magnitude relationship between the detected steering torque T and the command steering torque T* is inversed from that in the immediately preceding calculation cycle (S131). More specifically, the addition angle guard 41 stores the magnitude relationship between the detected steering torque T and the command steering torque T* in the immediately preceding calculation cycle. The addition angle guard 41 determines whether the magnitude relationship between the detected steering torque T and the command steering torque T* is inversed from that in the immediately preceding calculation cycle based on the information concerning the magnitude relationship between the command steering torque T* and the detected steering torque T provided from the torque deviation monitoring unit 40 in the present calculation cycle and the magnitude relationship between the command steering torque T* and the detected steering torque T in the immediately preceding calculation cycle.

When the magnitude relationship between the detected steering torque T and the command steering torque T* is not inversed from that in the immediately preceding calculation cycle ("NO" in S131), the addition angle guard 41 resets the variable K to 0 (S132). Then, S134 is executed. When the magnitude relationship between the detected steering torque T and the command steering torque T* is inversed at every calculation cycle, the variable K is used to count the number of times that the inversion repeatedly occurs. The initial value of the variable K is 0.

When it is determined in S131 that the magnitude relationship between the detected steering torque T and the command steering torque T* is inversed from that in the immediately preceding calculation cycle ("YES" in S131), the addition angle guard 41 increments the variable K by 1 (S133). Then, S134 is executed.

Figure 12:
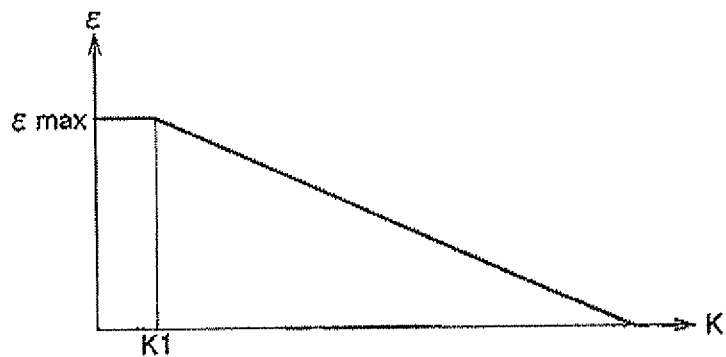
FIG. 12 is a graph showing an example of a manner of setting the angular displacement error $\epsilon$ with respect to the number of times of repetitions K.

In S134, the addition angle guard 41 determines the angular displacement error ε based on the variable K, that is, the number of times that the inversion repeatedly occurs. More specifically, the addition angle guard 41 decreases the angular displacement error ε as the number of times K that the inversion repeatedly occurs increases. More specifically, as shown in FIG. 12, the addition angle guard 41 sets the angular displacement error ε to the angular displacement maximum error εmax when the number of times K that the inversion repeatedly occurs is within a range equal to or larger than 0 and smaller than the predetermined value K1. When the number of times K that the inversion repeatedly occurs is equal to or larger than the predetermined value K1, the addition angle guard 41 sets the angular displacement error ε to a smaller value as the number of times K that the inversion repeatedly occurs increases.

Figure 13:
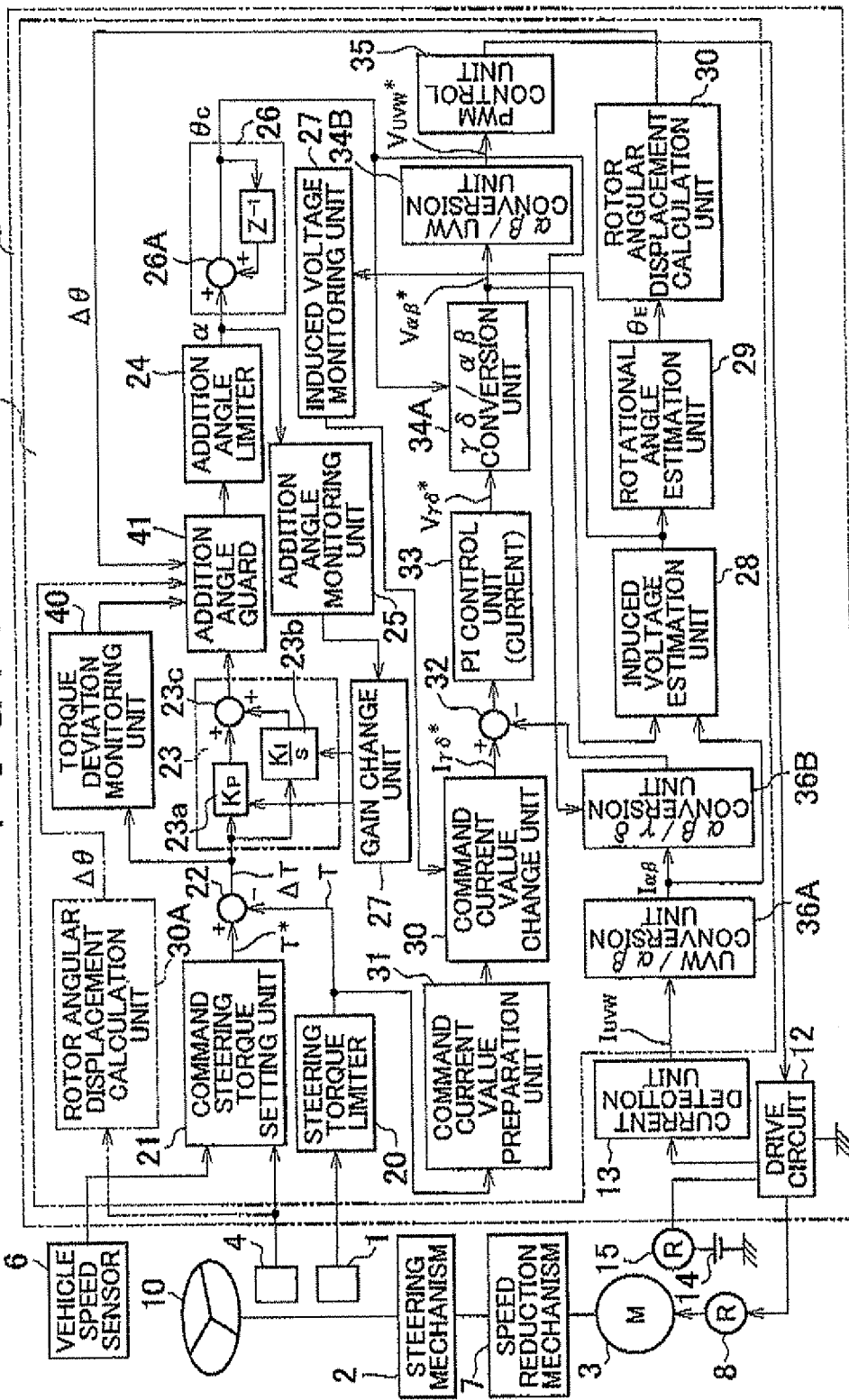
FIG. 13 is a block diagram illustrating the configuration of an electric power steering apparatus according to a third embodiment of the invention.

FIG. 13 is a block diagram showing the configuration of an electric power steering apparatus according to a third embodiment of the invention. The portions that correspond to those in FIG. 1 are denoted by the same reference numerals as those in FIG. 1.

In the third embodiment, the microcomputer 11 further includes an induced voltage monitoring unit 27 and a command current value change unit 30 as the function processing units. A battery 14 is connected to the drive circuit 12 via a power source relay 15. The drive circuit 12 is connected to the motor 3 via a motor relay 8.

When the rotational speed of the motor 3 (the angular speed of the rotor 50) exceeds the no-load rotational speed due to an external force, the waveform of the induced voltage that is generated by the motor 3 is distorted. For example, the waveform of the induced voltage is no longer a sine-wave form. If the waveform of the induced voltage that is generated by the motor 3 is distorted, the induced voltage estimation unit 28 does not properly perform the function of estimating the induced voltage. Therefore, an error in the rotor angular displacement Δθ in the calculation cycle that is calculated by the rotor angular displacement calculation unit 30 increases. Then, the addition angle guard 41 does not properly perform the function of correcting the addition angle α. Therefore, in the third embodiment, when the estimated induced voltage Ê αβ that is estimated by the induced voltage estimation unit 28 exceeds the threshold Eth, it is determined that the rotational speed of the motor 3 is higher than the no-load rotational speed and a torque control over the motor 3 is stopped.

The induced voltage monitoring unit 27 monitors the estimated induced voltage Ê αβ that is estimated by the induced voltage estimation unit 28. More specifically, the induced voltage monitoring unit 27 monitors whether the estimated induced voltage Ê αβ exceeds the threshold Eth. More specifically, the induced voltage monitoring unit 27 monitors whether at least one of the α-axis induced voltage estimated value Ê α and the β-axis induced voltage estimated value Ê β exceeds the threshold Eth. For example, a detected value of the battery voltage, a detected value of the inverter voltage or a preset fixed value may be used as the threshold Eth.

When the estimated induced voltage Ê αβ exceeds the threshold Eth, that is, when at least one of the α-axis induced voltage estimated value Ê α and the β-axis induced voltage estimated value Ê β exceeds the threshold Eth, the induced voltage monitoring unit 27 provides the command current value change unit 30 with this information. When being provided with the information that the estimated induced voltage Ê αβ exceeds the threshold Eth from the induced voltage monitoring unit 27, the command current value change unit 30 changes the command current value to 0. That is, the manner of controlling the motor 3 is changed by the induced voltage monitoring unit 27 and the command current value change unit 30. The process for changing the manner of controlling the motor 3 based on the estimated induced voltage will be referred to as "process for changing the control manner based on the estimated induced voltage".

FIG. 14 is a flowchart showing the steps of the process for changing the control manner based on the estimated induced voltage, which is executed by the induced voltage monitoring unit 27 and the command current value change unit 30. The process is periodically executed at every calculation cycle. The induced voltage monitoring unit 27 determines whether the estimated induced voltage $\hat{E}\alpha\beta$ is higher than the threshold Eth (S141). When the estimated induced voltage $\hat{E}\alpha\beta$ is equal to or lower than the threshold Eth, that is, when the $\alpha$-axis induced voltage estimated value $\hat{E}\alpha$ and the $\beta$-axis induced voltage estimated value $\hat{E}\beta$ are both equal to or lower than the threshold Eth ("NO" in S141), the induced voltage monitoring unit 27 does not provide any information to the command current value change unit 30. Therefore, the command current value change unit 30 outputs the command current value that is prepared by the command current value preparation unit 32 without correction (S142).

On the other hand, when the estimated induced voltage $\hat{E}\alpha\beta$ is higher than the threshold Eth, that is, when at least one of the $\alpha$-axis induced voltage estimated value $\hat{E}\beta$ and the $\beta$-axis induced voltage estimated value $\hat{E}\beta$ is higher than the threshold Eth ("YES" in S141), the induced voltage monitoring unit 27 provides the command current value change unit 30 with this information. When being provided with the information that the estimated induced voltage $\hat{E}\alpha\beta$ exceeds the threshold Eth, the command current value change unit 30 changes the command current value to 0 (S143). Thus, the torque control over the motor 3 is stopped. As a result, the manual steering state where a steering assist force is not applied takes place.

FIG. 15 is a flowchart showing the process for changing the control manner based on the estimated induced voltage according to a fourth embodiment of the invention. This process is periodically executed at every calculation cycle. The induced voltage monitoring unit 27 determines whether the estimated induced voltage $\hat{E}\alpha\beta$ is higher than the threshold Eth (S151). When the estimated induced voltage $\hat{E}\alpha\beta$ is equal to or lower than the threshold Eth ("NO" in S151), if at least one of the power source relay 15 and the motor relay 8 is off, the induced voltage monitoring unit 27 turns on the relay that has been off (S152).

On the other hand, when the estimated induced voltage $\hat{E}\alpha\beta$ is higher than the threshold Eth ("YES" in S151), the induced voltage monitoring unit 27 turns off at least one of the power supply relay 15 and the motor relay 8 (S153). Thus, the torque control over the motor 3 is stopped. As a result, the manual steering state where a steering assist force is not applied takes place.

Each embodiment described above relates to the motor control unit 5 used to control the motor 3 that includes the rotor 50 and the stator 55 that faces the rotor 50. The current drive units 31 to 36 drives the motor 3 at the axis current value $I\gamma^*$ of the rotating coordinate system that rotates in accordance with the control angle $\theta C$ that is the rotational angle used in the control. The addition angle calculation units 22 and 23 calculate the addition angle $\alpha$ that should be added to the control angle $\theta C$. The control angle calculation unit 26 obtains the present value of the control angle $\theta C$ by adding the addition angle $\alpha$ that is calculated by the addition angle calculation units 22 and 23 to the immediately preceding value of the control angle $\theta C$ at every predetermined calculation cycle. The torque detection unit 1 detects the torque T that is other than the motor torque and that is applied to the drive target 2 that is driven by the motor 3. The command torque setting unit 21 sets the command torque T* (command value for the torque other than the motor torque) that should be applied to the drive target 2. The addition angle correction units 40 and 41 compare the command torque T* that is set by the command torque setting unit 21 with the detected torque T that is detected by the torque detection unit 1, and adjusts the addition angle $\alpha$ based on the result of comparison.

With this configuration, the addition angle $\alpha$ is added to the control angle $\theta C$ at every calculation cycle to update the control angle $\theta C$ while the motor 3 is driven at the axis current value (imaginary axis current value) $I\gamma^*$ of the rotating coordinate system that rotates in accordance with the control angle $\theta C$ ($\gamma\delta$ coordinate system, imaginary rotating coordinate system). Thus, it is possible to generate a required torque by driving the motor 3 at the imaginary axis current value $I\gamma^*$ while updating the control angle $\theta C$, that is, while updating the coordinate axis (imaginary axis) of the imaginary rotating coordinate system. Thus, it is possible to generate an appropriate torque from the motor 3 without using a rotational angle sensor.

In the embodiments described above, the torque that is other than the motor torque and that is applied to the drive target 2 is detected by the torque detection unit 1. Also, the command torque T* that should be applied to the drive target 2 is set by the command torque setting unit 21. The addition angle calculation units 22 and 23 operate so as to calculate the addition angle $\alpha$ so that the detected torque T that is detected by the torque detection unit 1 coincides with the command torque T*. Thus, the motor torque is controlled in such a manner that the torque (torque other than the motor torque) corresponding to the command torque T* is applied to the drive target 2. The motor torque corresponds to the load angle $\theta L$ that is the amount of deviation of the coordinate axis of the rotating coordinate system (dq coordinate system), which extends in the direction of the magnetic poles of the rotor 50, from the imaginary axis. The load angle $\theta L$ is expressed by the difference between the control angle $\theta C$ and the rotor angle $\theta M$. The motor torque is controlled by adjusting the load angle $\theta L$, and the load angle $\theta L$ is adjusted by controlling the addition angle $\alpha$.

The command torque T* and the detected torque T are compared with each other, and the addition angle $\alpha$ is adjusted based on the result of comparison. Thus, for example, when the addition angle $\alpha$ that does not conform to the magnitude relationship between the command torque T* and the detected torque T is calculated, it is possible to correct this addition angle $\alpha$ to an appropriate value.

In the embodiments described above, there is further provided the angular displacement calculation unit 30 that calculates the angular displacement $\Delta\theta$ of the rotor 50 in the calculation cycle, and the addition angle correction units 40 and 41 correct the addition angle $\alpha$ in such a manner that the addition angle $\alpha$ is brought to a value that is within the predetermined range that is determined based on the angular displacement $\Delta\theta$ calculated by the angular displacement calculation unit 30.

The control angle $\theta C$ changes by the addition angle $\alpha$ in the calculation cycle. That is, the amount of change in the control angle $\theta C$ in the calculation cycle is equal to the addition angle $\alpha$. When the addition angle $\alpha$ is larger than the angular displacement $\Delta\theta$ of the rotor 50 in the calculation cycle, the load angle $\theta L$ increases. Therefore, when the load angle $\theta L$ and the motor torque are positively correlated with each other, the motor torque increases as the load angle θL increases. On the other hand, when the load angle θL and the motor torque are negatively correlated with each other, the motor torque decreases as the load angle θL increases. As described above, the load angle θL and the motor torque are correlated with each other.

When a given torque is applied to the drive target 2 as a whole (for example, when a shortage in the torque is covered by the motor torque), the torque that is other than the motor torque and that is applied to the drive target 2 is decreased by increasing the motor torque. Therefore, the detected torque T decreases. On the other hand, when the motor torque decreases, the torque that is other than the motor torque and that is applied to the drive target 2 increases. Therefore, the detected torque T increases. Accordingly, if the magnitude relationship between the command torque T* and the detected torque T and the magnitude relationship between the rotor angular displacement Δθ in the calculation cycle and the addition angle α are appropriate, the detected torque T approaches the command torque T*. Therefore, the addition angle correction units 40 and 41 correct the addition angle α in such a manner that the addition angle α is brought to a value within the predetermined range that is determined based on the angular displacement Δθ of the rotor 50, according to the result of comparison between the detected torque T and the command torque T*.

More specifically, when the load angle θL and the motor torque are positively correlated with each other, the addition angle α is corrected preferably in the following manner. If the detected torque T is higher than the command torque T*, the addition angle correction units 40 and 41 correct the addition angle α to a value equal to or larger than the angular displacement Δθ that is calculated by the angular displacement calculation unit 30. On the other hand, if the detected torque T is lower than the command torque T*, the addition angle correction units 40 and 41 correct the addition angle α to a value equal to or smaller than the angular displacement Δθ that is calculated by the angular displacement calculation unit 30.

When the load angle θL and the motor torque are positively correlated with each other, if the detected torque T is higher than the command torque T* and the addition angle α is larger than the rotor angular displacement Δθ in the calculation cycle, the detected torque T approaches the command torque T*. Therefore, when the detected torque T is higher than the command torque T*, if the addition angle α is smaller than the rotor angular displacement Δθ in the calculation cycle, the addition angle correction units 40 and 41 correct the addition angle α to a value equal to or larger than the rotor angular displacement Δθ in the calculation cycle. On the other hand, when the detected torque T is lower than the command torque T*, if the addition angle α is smaller than the rotor angular displacement Δθ in the calculation cycle, the detected torque T approaches the command torque T*. Therefore, when the detected torque T is lower than the command torque T*, if the addition angle α is larger than the rotor angular displacement Δθ in the calculation cycle, the addition angle correction units 40 and 41 correct the addition angle α to a value equal to or smaller than the rotor angular displacement Δθ in the calculation cycle.

As described above, it is possible to correct the addition angle α to an appropriate value based on the magnitude relationship between the detected torque T and the command torque T*. Therefore, it is possible to execute an appropriate control so that the detected torque T approaches the command torque T*.

When the load angle θL and the motor torque are positively correlated with each other, if the detected torque T is higher than the command torque T* and the addition angle α is excessively larger than the rotor angular displacement Δθ in the calculation cycle, it takes a long time to bring the addition angle α to an appropriate value. On the other hand, when the detected torque T is lower than the command torque T*, if the addition angle α is excessively smaller than the rotor angular displacement Δθ in the calculation cycle, it takes a long time to bring the addition angle α to an appropriate value. Therefore, the addition angle α is corrected preferably in the following manner. When the detected torque T is higher than the command torque T*, the addition angle correction units 40 and 41 correct the addition angle α to a value that is equal to or smaller than the value that is larger than the angular displacement Δθ calculated by the angular displacement calculation unit 30 by the predetermined change limit A. On the other hand, when the detected torque T is lower than the command torque T*, the addition angle correction units 40 and 41 correct the addition angle α to a value that is equal to or larger than the value that is smaller than the angular displacement Δθ calculated by the angular displacement calculation unit 30 by the predetermined change limit A. Thus, the addition angle α is more easily brought to an appropriate value. As a result, it is possible to stabilize the control. Accordingly, even if an abnormality occurs in the control, it is possible to effectively encourage the control to move to the normal state. Therefore, both the lower limit and the upper limit for the addition angle α are determined based on the angular displacement Δθ in the calculation cycle. As a result, it is possible to execute the more appropriate control.

On the other hand, when the load angle θL and the motor torque are negatively correlated with each other, the addition angle α is corrected preferably in the following manner. If the detected torque T is lower than the command torque T*, the addition angle correction units 40 and 41 correct the addition angle α to a value equal to or larger than the angular displacement Δθ calculated by the angular displacement calculation unit 30. On the other hand, if the detected torque T is higher than the command torque T*, the addition angle correction units 40 and 41 correct the addition angle α to a value equal to or smaller than the angular displacement Δθ calculated by the angular displacement calculation unit 30.

When the load angle θL and the motor torque are negatively correlated with each other, if the detected torque T is lower than the command torque T* and the addition angle α is larger than the rotor angular displacement Δθ in the calculation cycle, the detected torque T approaches the command torque T*. Therefore, when the detected torque T is lower than the command torque T*, if the addition angle α is smaller than the rotor angular displacement Δθ in the calculation cycle, the addition angle correction units 40 and 41 correct the addition angle α to a value equal to or larger than the rotor angular displacement Δθ in the calculation cycle. When the detected torque T is higher than the command torque T*, if the addition angle α is smaller than the rotor angular displacement Δθ in the calculation cycle, the detected torque T approaches the command torque T*. Therefore, when the detected torque T is higher than the command torque T*, if the addition angle α is larger than the rotor angular displacement Δθ in the calculation cycle, the addition angle correction units 40 and 41 correct the addition angle α to a value equal to or smaller than the rotor angular displacement Δθ in the calculation cycle.

Thus, it is possible to correct the addition angle α to an appropriate value based on the magnitude relationship between the detected torque T and the command torque T*.

As a result, it is possible to execute an appropriate control so that the detected torque T approaches the command torque T*.

When the load angle θL and the motor torque are negatively correlated with each other, if the detected torque T is lower than the command torque T* and the addition angle α is excessively larger than the rotor angular displacement Δθ in the calculation cycle, it takes a long time to bring the addition angle α to an appropriate value. On the other hand, when the detected torque T is higher than the command torque T*, if the addition angle α is excessively smaller than the rotor angular displacement Δθ in the calculation cycle, it takes a long time to bring the addition angle α to an appropriate value. Therefore, the addition angle α is corrected preferably in the following manner. When the detected torque T is lower than the command torque T*, the addition angle correction units 40 and 41 correct the addition angle α to a value that is equal to or smaller than the value that is larger than the angular displacement Δθ calculated by the angular displacement calculation unit 30 by the predetermined change limit A. On the other hand, when the detected torque T is higher than the command torque T*, the correction units 40 and 41 correct the addition angle α to a value that is equal to or larger than the value that is smaller than the angular displacement Δθ calculated by the angular displacement calculation unit 30 by the predetermined change limit A. Thus, the addition angle α is more easily brought to an appropriate value. Therefore, it is possible to stabilize the control. Accordingly, even if an abnormality occurs in the control, it is possible to effectively encourage the control to move to the normal state. Therefore, both the lower limit and the upper limit for the addition angle α are determined based on the angular displacement Δθ in the calculation cycle. As a result, it is possible to execute a more appropriate control.

In the second embodiment, the addition angle correction units 40 and 41 determine the predetermined range based on the value (Δθ+ε) that is obtained by adding the value ε pertaining to a calculation error in the angular displacement Δθ to the angular displacement Δθ calculated by the angular displacement calculation unit 30 and the value (Δθ−ε) that is obtained by subtracting the value ε pertaining to a calculation error in the angular displacement Δθ from the angular displacement Δθ calculated by the angular displacement calculation unit 30.

In the case where the load angle θL and the motor torque are positively correlated with each other, when the detected torque T is higher than the command torque T*, if the addition angle α is larger than the actual rotor angular displacement Δθ in the calculation cycle, the detected torque T approaches the command torque T*, as described above. Therefore, when the detected torque T is higher than the command torque T*, if the addition angle α is smaller than the rotor angular displacement Δθ in the calculation cycle that is calculated by the angular displacement calculation unit 30 (hereinafter, referred to as "estimated rotor angular displacement" in order to distinguish this from the actual rotor angular displacement), the addition angle α may be corrected to a value equal to or larger than the estimated rotor angular displacement Δθ.

However, when there is an error in the estimated rotor angular displacement Δθ, for example, when the estimated rotor angular displacement Δθ is smaller than the actual rotor angular displacement Δθtrue, even if the addition angle α is corrected to a value equal to or larger than the estimated rotor angular displacement Δθ, there is a possibility that the addition angle α does not reach the actual rotor angular displacement Δθtrue. According to the second embodiment, when the detected torque T is higher than the command torque T*, the addition angle correction units 40 and 41 can correct the addition angle α to a value equal to or larger than the value (Δθ+ε) that is obtained by adding the error ε to the angular displacement Δθ. Therefore, when the detected torque T is higher than the command torque T*, it is possible to bring the addition angle α to a value equal to or larger than the actual rotor angular displacement Δθtrue.

On the other hand, when the detected torque T is lower than the command torque T*, if the addition angle α is smaller than the rotor angular displacement Δθ in the calculation cycle, the detected torque T approaches the command torque T*. Therefore, when the detected torque T is lower than the command torque T*, if the addition angle α is larger than the estimated rotor angular displacement Δθ, the addition angle α may be corrected to a value equal to or smaller than the estimated rotor angular displacement Δθ.

However, when there is an error ε in the estimated rotor angular displacement Δθ, for example, when the estimated rotor angular displacement Δθ is larger than the actual rotor angular displacement Δθtrue, even if the addition angle α is corrected to a value equal to or smaller than the estimated rotor angular displacement Δθ, there is a possibility that the addition angle α does not fall below the actual rotor angular displacement Δθtrue. In the second embodiment, when the detected torque T is lower than the command torque T*, the addition angle correction units 40 and 41 can correct the addition angle α to a value equal to or smaller than the value (Δθ−ε) that is obtained by subtracting the error ε from the estimated rotor angular displacement Δθ. Therefore, when the detected torque T is lower than the command torque T*, it is possible to bring the addition angle α to a value equal to or smaller than the actual rotor angular displacement Δθtrue.

When the load angle θL and the motor torque are negatively correlated with each other, if the detected torque T is higher than the command torque T*, it is possible to correct the addition angle α to a value equal to or smaller than the value (Δθ−ε) that is obtained by subtracting the error ε from the estimated rotor angular displacement Δθ. When the load angle GL and the motor torque are negatively correlated with each other, if the detected torque T is lower than the command torque T*, it is possible to correct the addition angle α to a value equal to or smaller than the value (Δθ+ε) that is obtained by adding the error ε to the angular displacement Δθ. Therefore, in the second embodiment, even if there is the error ε in the angular displacement Δθ calculated by the angular displacement calculation unit 30, it is possible to execute an appropriate control so that the detected torque T approaches the command torque T*.

The value ε pertaining to the calculation error in the angular displacement Δθ may be, for example, the maximum value εmax of the error in the calculation executed by the angular displacement calculation unit, which is obtained in advance. When the magnitude relationship between the detected torque T and the command torque T* is alternately inversed, the value ε pertaining to the calculation error in the angular displacement Δθ may be smaller than the maximum value εmax of the error. In this case, the value ε pertaining to the calculation error in the angular displacement Δθ may be decreased as the number of times that the inversion of the magnitude relationship between the detected torque T and the command torque T* repeatedly occurs.

In each of the third and fourth embodiments, there are provided the induced voltage estimation unit 28 that estimates the induced voltage of the motor 3 and the units 29 and 30 that calculate the angular displacement Δθ of the rotor 50 in the calculation cycle based on the induced voltage E^αβ that is estimated by the induced voltage estimation unit 28. In each of the third and fourth embodiments, there are further provided the units 27 and 30 that stop the control over the motor 3 when the induced voltage $E\hat{}\alpha\beta$ that is estimated by the induced voltage estimation unit 28 exceeds the predetermined threshold Eth. With this configuration, the angular displacement calculation unit 30 calculates the angular displacement $\Delta\theta$ of the rotor in the calculation cycle based on the induced voltage $E\hat{}\alpha\beta$ that is estimated by the induced voltage estimation unit 28. When the induced voltage $E\hat{}\alpha\beta$ that is estimated by the induced voltage estimation unit 28 exceeds the predetermined threshold Eth, the control over the motor 3 is stopped. The threshold Eth may be, for example, a fixed value that is set in advance or a detected value of the voltage output from the battery 14 that serves as the power source for the drive circuit 12 for the motor 3.

When the rotational speed of the motor 3 exceeds the no-load rotational speed of the motor 3 due to, for example, an external force, the waveform of the induced voltage that is generated by the motor 3 is distorted. If the waveform of the induced voltage that is generated by the motor 3 is distorted, there is a possibility that the induced voltage estimation unit 28 does not properly perform the function of estimating the induced voltage and an error in the rotor angular displacement $\Delta\theta$ in the calculation cycle that is calculated by the angular displacement calculation unit 30 increases. This raises a possibility that the addition angle correction units 40 and 41 do not properly perform the function of correcting the addition angle $\alpha$. With this configuration, if the rotational speed of the motor 3 exceeds the no-load rotational speed and the possibility that the addition angle correction units 40 and 41 do not properly perform the function of correcting the addition angle $\alpha$ is raised, it is possible to stop the control over the motor 3. Therefore, it is possible to avoid the situation where the control over the motor 3 is executed in the state where the addition angle correction units 40 and 41 do not properly perform the function of correcting the addition angle $\alpha$.

The motor control unit may further include the addition angle limiting unit 24 that limits the addition angle $\alpha$ with the use of the predetermined limit $\omega$max. Imposing appropriate limits on the addition angle $\alpha$ makes it possible to avoid the situation where the addition angle $\alpha$ that is excessively large with respect to the actual rotation of the rotor is added to the control angle $\theta C$. Thus, it is possible to appropriately control the motor 3.

The limit $\omega$max may be, for example, a value that is determined according to the following equation. Note that "maximum rotor angular speed" in the following equation is the maximum value of the rotor angular speed in the electrical angle.

$$\text{Limit} = \text{maximum rotor angular speed} \times \text{calculation cycle}$$

For example, when the rotation of the motor is transmitted to the steering shaft of the vehicle steering apparatus via the speed reduction mechanism having a predetermined speed reduction ratio, the maximum rotor angular speed is expressed by the equation, maximum steering angular speed (maximum rotational angular speed of the steering shaft)× speed reduction ratio×number of pole pairs. "Number of pole pairs" signifies the number of pole pairs (pair of north pole and south pole) of the rotor.

The addition angle calculation units 22 and 23 may include feedback control units 22 and 23 that calculate the addition angle $\alpha$ so that the detected torque T approaches the command torque T*.

The motor 3 may apply a drive power to the steering mechanism 2 of the vehicle. In this case, the torque detection unit 1 may detect the steering torque T that is applied to the operation member 10 that is operated to steer the vehicle. The command torque setting unit 21 may set the command steering torque T* that is used as the target value of the steering torque T. Then, the addition angle calculation units 22 and 23 may calculate the addition angle $\alpha$ based on the deviation of the steering torque T that is detected by the torque detection unit 1 from the command steering torque T* that is set by the command torque setting unit 21.

With this configuration, the command steering torque T* is set, and the addition angle $\alpha$ is calculated based on the deviation $\Delta T$ of the steering torque (detected value) T from the command steering torque T*. Thus, the addition angle $\alpha$ is set in such a manner that the steering torque T coincides with the command steering torque T*, and the control angle $\theta C$ corresponding to the addition angle $\alpha$ is set. Therefore, if the command steering torque T* is appropriately set, an appropriate drive power is generated by the motor 3 and applied to the steering mechanism 2. That is, the amount of deviation (load angle $\theta L$) of the coordinate axis of the rotating coordinate system (dq coordinate system), which extends in the direction of the magnetic poles of the rotor 50, from the imaginary axis is brought to a value corresponding to the command steering torque T*. As a result, an appropriate torque is generated by the motor 3, and a drive power that reflects the intention of the driver is applied to the steering mechanism 2.

Preferably, the motor control unit further includes the steering angle detection unit 4 that detects the steering angle of the operation member 10, and the command torque setting unit 21 sets the command steering torque T* based on the steering angle that is detected by the steering angle detection unit 4. With this configuration, because the command steering torque T* is set based on the steering angle of the operation member 10, an appropriate torque corresponding to the steering angle is generated by the motor 3. Therefore, it is possible to bring the steering torque T that is applied to the operation member 10 by the driver to a value corresponding to the steering angle. Thus, it is possible to obtain a good steering feel.

The command torque setting unit 21 may set the command steering torque T* based on the vehicle speed that is detected by the vehicle speed detection unit 6 that detects the speed of the vehicle. With this configuration, because the command steering torque T* is set based on the vehicle speed, it is possible to execute a so-called vehicle speed-sensitive control. As a result, it is possible to obtain a good steering feel. For example, as the vehicle speed increases, that is, as speed at which the vehicle travels increases, the command steering torque T* is set to a lower value. Thus, it is possible to obtain a good steering feel.

Several embodiments of the invention have been described above. Note that the invention may be implemented in other embodiments. For example, in the embodiments described above, the rotor angular displacement $\Delta\theta$ is obtained with the use of, for example, the induced voltage estimation unit 28. Alternatively, as indicated by a two-dot chain line in FIG. 1, there may be provided a rotor angular displacement calculation unit 30A that converts a change in the steering angle that is detected by the steering angle sensor 4 into the rotor angular displacement $\Delta\theta$ in the calculation cycle.

Also, in the embodiments described above, the configuration in which a rotational angle sensor is not provided and the motor 3 is driven by executing the sensorless control has been described. Alternatively, the configuration in which a rotational angle sensor, for example, a resolver is provided and the above-described sensorless control is executed when the rotational angle sensor malfunctions may be employed. Thus, even if the rotational angle sensor malfunctions, the motor 3 is continuously driven. Therefore, the steering assist operation is continuously executed. In this case, when the rotational angle sensor is used, the δ-axis command current value Iδ* is generated by the command current value preparation unit 31 based on the steering torque and the vehicle speed according to the predetermined assist characteristic.

In the embodiments described above, the invention is applied to the electric power steering apparatus. Alternatively, the invention may be applied to a motor control for an electric pump hydraulic power steering apparatus. Further alternatively, the invention may be implemented in various embodiments other than a power steering apparatus. For example, the invention may be applied to a steer-by-wire (SBW) system, a variable gear ratio (VGR) steering system, and a control over a brushless motor provided in another vehicle steering apparatus. The motor control unit according to the invention may be used in a control not only for the vehicle steering apparatus but also for motors for other use.

In addition, various design change may be made within the scope of the claims.

What is claimed is:

1. A motor control unit that is used to control a motor that includes a rotor and a stator that faces the rotor without usage of a rotational angle signal from a rotation angle sensor, comprising:
   a current drive unit that drives the motor at an axis current value of a rotating coordinate system that rotates in accordance with a control angle that is a rotational angle used in a control and calculated without using a rotational angle sensor that detects a rotation angle of the rotor so that the control angle is determined independently from the rotation angle of the rotor;
   an addition angle calculation unit that calculates, without detecting a change of the rotation angle of the rotor, an addition angle that is to be added to the control angle;
   a control angle calculation unit that obtains, at every predetermined calculation cycle, a present value of the control angle by adding the addition angle that is calculated by the addition angle calculation unit to an immediately preceding value of the control angle;
   a torque detection unit that detects a torque that is other than a motor torque and that is applied to a drive target that is driven by the motor;
   a command torque setting unit that sets a command torque that is to be applied to the drive target; and
   an addition angle correction unit that compares the command torque that is set by the command torque setting unit with the detected torque that is detected by the torque detection unit, and corrects the addition angle based on a result of comparison.

2. The motor control unit according to claim 1, further comprising:
   an angular displacement calculation unit that calculates an angular displacement of the rotor in the calculation cycle,
   wherein the addition angle correction unit corrects the addition angle in such a manner that the addition angle is brought to a value within a predetermined range that is determined based on the angular displacement that is calculated by the angular displacement calculation unit.

3. The motor control unit according to claim 2, wherein:
   when the detected torque is higher than the command torque, the addition angle correction unit corrects the addition angle to a value that is equal to or larger than the angular displacement that is calculated by the angular displacement calculation unit; and
   when the detected torque is lower than the command torque, the addition angle correction unit corrects the addition angle to a value that is equal to or smaller than the angular displacement that is calculated by the angular displacement calculation unit.

4. The motor control unit according to claim 3, wherein:
   when the detected torque is higher than the command torque, the addition angle correction unit corrects the addition angle to a value that is equal to or smaller than a value that is larger than the angular displacement calculated by the angular displacement calculation unit by a predetermined change limit; and
   when the detected torque is lower than the command torque, the addition angle correction unit corrects the addition angle to a value that is equal to or larger than a value that is smaller than the angular displacement calculated by the angular displacement calculation unit by the predetermined change limit.

5. The motor control unit according to claim 2, wherein:
   when the detected torque is lower than the command torque, the addition angle correction unit corrects the addition angle to a value that is equal to or larger than the angular displacement calculated by the angular displacement calculation unit; and
   when the detected torque is higher than the command torque, the addition angle correction unit corrects the addition angle to a value that is equal to or smaller than the angular displacement calculated by the angular displacement calculation unit.

6. The motor control unit according to claim 5, wherein:
   when the detected torque is lower than the command torque, the addition angle correction unit corrects the addition angle to a value that is equal to or smaller than a value that is larger than the angular displacement calculated by the angular displacement calculation unit by a predetermined change limit; and
   when the detected torque is higher than the command torque, the addition angle correction unit corrects the addition angle to a value that is equal to or larger than a value that is smaller than the angular displacement calculated by the angular displacement calculation unit by the predetermined change limit.

7. The motor control unit according to claim 2,
   wherein the addition angle correction unit determines the predetermined range based on a value that is obtained by adding a value pertaining to a calculation error in the angular displacement to the angular displacement calculated by the angular displacement calculation unit and a value obtained by subtracting the value pertaining to the calculation error in the angular displacement from the angular displacement calculated by the angular displacement calculation unit.

8. The motor control unit according to claim 2, wherein:
   the angular displacement calculation unit estimates an induced voltage of the motor, and calculates the angular displacement of the rotor in the calculation cycle based on the estimated induced voltage; and
   when the estimated induced voltage exceeds a predetermined threshold, a control over the motor is stopped.

9. The motor control unit according to claim 1, wherein:
   a rotational angle signal from a rotation angle sensor is not used.

10. The motor control unit according to claim 1, wherein:
    the motor control unit is utilized in a steer-by-wire system.

11. A motor control unit for a vehicle steering apparatus that has a motor that includes a rotor and a stator that faces the rotor without usage of a rotational angle signal from a rotation angle sensor, and a vehicle steering mechanism to which a drive power is applied by the motor, comprising:
- a current drive unit that drives the motor at an axis current value of a rotating coordinate system that rotates in accordance with a control angle that is a rotational angle used in a control and calculated without using a rotational angle sensor that detects a rotation angle of the rotor so that the control angle is determined independently from the rotation angle of the rotor;
- an addition angle calculation unit that calculates, without detecting a change of the rotation angle of the rotor, an addition angle that is to be added to the control angle;
- a control angle calculation unit that obtains, at every predetermined calculation cycle, a present value of the control angle by adding the addition angle that is calculated by the addition angle calculation unit to an immediately preceding value of the control angle;
- a torque detection unit that detects a steering torque that is applied to an operation member;
- a command steering torque setting unit that sets a command steering torque that is to be applied to the operation member; and
- an addition angle correction unit that compares the command steering torque that is set by the command steering torque setting unit with the detected steering torque that is detected by the torque detection unit, and corrects the addition angle based on a result of comparison.

12. The motor control unit for the vehicle steering apparatus according to claim 11, further comprising
- an angular displacement calculation unit that calculates an angular displacement of the rotor in the calculation cycle,
- wherein the addition angle correction unit corrects the addition angle in such a manner that the addition angle is brought to a value within a predetermined range that is determined based on the angular displacement that is calculated by the angular displacement calculation unit.

13. The motor control unit for the vehicle steering apparatus according to claim 12, wherein:
- when the detected steering torque is higher than the command steering torque, the addition angle correction unit corrects the addition angle to a value that is equal to or larger than the angular displacement that is calculated by the angular displacement calculation unit; and
- when the detected steering torque is lower than the command steering torque, the addition angle correction unit corrects the addition angle to a value that is equal to or smaller than the angular displacement that is calculated by the angular displacement calculation unit.

14. The motor control unit for the vehicle steering apparatus according to claim 13, wherein:
- when the detected steering torque is higher than the command steering torque, the addition angle correction unit corrects the addition angle to a value that is equal to or smaller than a value that is larger than the angular displacement calculated by the angular displacement calculation unit by a predetermined change limit; and
- when the detected steering torque is lower than the command steering torque, the addition angle correction unit corrects the addition angle to a value that is equal to or larger than a value that is smaller than the angular displacement calculated by the angular displacement calculation unit by the predetermined change limit.

15. The motor control unit for the vehicle steering apparatus according to claim 12, wherein:
- when the detected steering torque is lower than the command steering torque, the addition angle correction unit corrects the addition angle to a value that is equal to or larger than the angular displacement calculated by the angular displacement calculation unit; and
- when the detected steering torque is higher than the command steering torque, the addition angle correction unit corrects the addition angle to a value that is equal to or smaller than the angular displacement calculated by the angular displacement calculation unit.

16. The motor control unit for the vehicle steering apparatus according to claim 15, wherein:
- when the detected steering torque is lower than the command steering torque, the addition angle correction unit corrects the addition angle to a value that is equal to or smaller than a value that is larger than the angular displacement calculated by the angular displacement calculation unit by a predetermined change limit; and
- when the detected steering torque is higher than the command steering torque, the addition angle correction unit corrects the addition angle to a value that is equal to or larger than a value that is smaller than the angular displacement calculated by the angular displacement calculation unit by the predetermined change limit.

17. The motor control unit for the vehicle steering apparatus according to claim 12,
- wherein the addition angle correction unit determines the predetermined range based on a value that is obtained by adding a value pertaining to a calculation error in the angular displacement to the angular displacement calculated by the angular displacement calculation unit and a value obtained by subtracting the value pertaining to the calculation error in the angular displacement from the angular displacement calculated by the angular displacement calculation unit.

18. The motor control unit for the vehicle steering apparatus according to claim 12, wherein:
- the angular displacement calculation unit estimates an induced voltage of the motor, and calculates the angular displacement of the rotor in the calculation cycle based on the estimated induced voltage; and
- when the estimated induced voltage exceeds a predetermined threshold, a control over the motor is stopped.

19. The motor control unit for the vehicle steering apparatus according to claim 11, wherein:
- a rotational angle signal from a rotation angle sensor is not used.

* * * * *